United States Patent
Kato et al.

(10) Patent No.: US 9,649,926 B2
(45) Date of Patent: May 16, 2017

(54) POWER TRANSMISSION DEVICE FOR A HYBRID VEHICLE AND HYBRID SYSTEM

(75) Inventors: Shunya Kato, Seto (JP); Atsushi Tabata, Okazaki (JP); Tatsuya Imamura, Okazaki (JP); Tooru Matsubara, Toyota (JP); Takeshi Kitahata, Toyota (JP); Kenta Kumazaki, Toyota (JP); Yasuhiro Hiasa, Nagoya (JP); Hiroyuki Shioiri, Numazu (JP); Hiroyuki Shibata, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 105 days.

(21) Appl. No.: 14/409,760

(22) PCT Filed: Jun. 19, 2012

(86) PCT No.: PCT/JP2012/065659
§ 371 (c)(1),
(2), (4) Date: Dec. 19, 2014

(87) PCT Pub. No.: WO2013/190641
PCT Pub. Date: Dec. 27, 2013

(65) Prior Publication Data
US 2015/0151627 A1    Jun. 4, 2015

(51) Int. Cl.
*B60K 6/445* (2007.10)
*B60K 6/54* (2007.10)
(Continued)

(52) U.S. Cl.
CPC .............. *B60K 6/445* (2013.01); *B60K 6/365* (2013.01); *B60K 6/54* (2013.01); *B60K 6/547* (2013.01);
(Continued)

(58) Field of Classification Search
None
See application file for complete search history.

(56) References Cited

U.S. PATENT DOCUMENTS

2008/0208422 A1* 8/2008 Shibata .................. B60K 6/365
701/54

FOREIGN PATENT DOCUMENTS

JP    2006-200644 A    8/2006
JP    2008 120233      5/2008
(Continued)

OTHER PUBLICATIONS

International Search Report Issued Jul. 31, 2012 in PCT/JP12/065659 Filed Jun. 19, 2012.

*Primary Examiner* — Ramya Burgess
*Assistant Examiner* — Timothy M Hannon
(74) *Attorney, Agent, or Firm* — Oblon, McClelland, Maier & Neustadt, L.L.P.

(57) ABSTRACT

A power transmission device for a hybrid vehicle includes: a transmission device that includes a carrier to which an engine rotation shaft is connected; a differential device that includes a plurality of rotation components individually connected to a drive wheel, an MG2 rotation shaft, an MG1 rotation shaft, and a ring gear of the transmission device; a gear shift adjustment device that is able to control the transmission device to a neutral state where the transmission of power between the carrier and the ring gear is not allowed or to a state where the transmission of power is allowed; and an HVECU that includes a first step of controlling the transmission device to the neutral state in a state where the transmission of power between the carrier and the ring gear is allowed.

8 Claims, 16 Drawing Sheets

(51) Int. Cl.
*B60W 20/10* (2016.01)
*B60K 6/365* (2007.10)
*B60K 6/547* (2007.10)
*B60W 10/08* (2006.01)
*B60W 10/10* (2012.01)
*B60W 20/00* (2016.01)
*F16H 37/08* (2006.01)
*F16H 3/72* (2006.01)

(52) U.S. Cl.
CPC ............ *B60W 10/08* (2013.01); *B60W 10/10* (2013.01); *B60W 20/00* (2013.01); *B60W 20/10* (2013.01); *F16H 3/728* (2013.01); *F16H 2037/0866* (2013.01); *F16H 2037/0873* (2013.01); *F16H 2200/2007* (2013.01); *F16H 2200/2035* (2013.01); *Y02T 10/6239* (2013.01); *Y10S 903/91* (2013.01); *Y10S 903/917* (2013.01); *Y10T 477/23* (2015.01)

(56) References Cited

FOREIGN PATENT DOCUMENTS

| JP | 2008 120234 | 5/2008 |
| JP | 2009-173174 A | 8/2009 |
| JP | 2009 190694 | 8/2009 |
| JP | 2010 70099 | 4/2010 |

\* cited by examiner

FIG.3

| | | | CL1 | BK1 | MG1 | MG2 |
|---|---|---|---|---|---|---|
| EV | FORWARD MOVEMENT/ BACKWARD MOVEMENT | SINGLE MOTOR, WITHOUT ENGINE BRAKE | | | G | M |
| | | SINGLE MOTOR, WITH ENGINE BRAKE | △ | △ | G | M |
| | | DUAL MOTOR | O | O | M | M |
| HV | FORWARD MOVEMENT | HIGH | | O | G | M |
| | | LOW | O | | G | M |
| | BACKWARD MOVEMENT | LOW | O | | G | M |

FIG.19

|  |  |  | CL1 | BK1 | MG1 | MG2 |
|---|---|---|---|---|---|---|
| EV | FORWARD MOVEMENT/ BACKWARD MOVEMENT | WITHOUT ENGINE BRAKE |  |  | G | M |
|  |  | WITH ENGINE BRAKE | △ | △ | G | M |
| HV | FORWARD MOVEMENT | HIGH |  | O | G | M |
|  |  | LOW | O |  | G | M |
|  | BACKWARD MOVEMENT | LOW | O |  | G | M |

POWER TRANSMISSION DEVICE FOR A HYBRID VEHICLE AND HYBRID SYSTEM

FIELD

The present invention relates to a power transmission device for a hybrid vehicle and a hybrid system that use an engine and a rotating electric machine as a power source.

BACKGROUND

Hitherto, a system that includes an engine, two rotating electric machines, and a power distribution mechanism (a planetary gear mechanism) is known as a hybrid system. In the hybrid system, a rotation shaft of the engine, a rotation shaft of the first rotating electric machine, a rotation shaft of the second rotating electric machine, and a drive wheel are connected to the rotation components of the power distribution mechanism. Patent Literature 1 below discloses a hybrid system in which a differential device including a pair of first and second planetary gear mechanisms, a clutch, and two brakes are interposed between a rotation shaft of an engine and a rotation component of a power distribution mechanism. The differential device is used as a transmission device which changes the rotation speed of the engine. The clutch has a configuration in which one engagement portion is connected to the rotation shaft of the engine and a carrier of the first planetary gear mechanism and the other engagement portion is connected to a ring gear of the first planetary gear mechanism. In the first planetary gear mechanism, the carrier and a sun gear respectively engage with the sun gear and the ring gear of the second planetary gear mechanism. The sun gear of the first planetary gear mechanism and the ring gear of the second planetary gear mechanism are connected to the carrier of the power distribution mechanism. The first brake is used to stop the rotation of the ring gear of the first planetary gear mechanism and the other engagement portion of the clutch. The second brake is used to stop the rotation of the carrier of the second planetary gear mechanism. In the hybrid system, an under-drive mode (a UD mode) is set in the middle-load state and the high-load state by the engagement of the clutch and the release of the brakes, an over-drive mode (an OD mode) is set in the low-load state by the release of the clutch and the second brake and the engagement of the first brake, and a backward movement mode is set by the release of the clutch and the first brake and the engagement of the second brake.

CITATION LIST

Patent Literature

Patent Literature 1: Japanese Patent Application Laid-open No. 2009-190694

SUMMARY

Technical Problem

Incidentally, in the hybrid system of the related art, the engine and the second rotating electric machine are used as the power sources, but the output of the first rotating electric machine is not transmitted to the drive wheel. Accordingly, it is desirable to provide an appropriate configuration in order to use the engine and two rotating electric machines as the power sources. However, if the engine is started up when the vehicle travels in an electric vehicle (EV) mode that only uses the output of the rotating electric machine depending on the configuration, there is a concern that a vibration (a gear shift shock) may be generated after the start-up.

Therefore, the present invention is made to solve the above-described problems of the related art, and an object thereof is to provide a power transmission device for a hybrid vehicle and a hybrid system capable of starting up an engine in an EV travel mode in which a vibration is suppressed.

Solution to Problem

In order to achieve the above mentioned object, a power transmission device for a hybrid vehicle according to the present invention includes a transmission device configured to include a first power transmission component to which a rotation shaft of an engine is connected; a differential device configured to include a plurality of rotation components capable of performing differential rotation thereof and including a rotation component connected to a second power transmission component of the transmission device, a rotation component connected to a rotation shaft of a first rotating electric machine, and a rotation component connected to a rotation shaft of a second rotating electric machine and a drive wheel; a gear shift adjustment device configured to be able to control the transmission device to a neutral state where transmission of power between the first power transmission component and the second power transmission component is not allowed or to a state where the transmission of power between the first power transmission component and the second power transmission component is allowed; and a control device configured to include a first step of controlling the transmission device of the neutral state to a state where the transmission of power between the first power transmission component and the second power transmission component is allowed, a second step of increasing rotating speed of the first rotating electric machine, and a third step of controlling the start-up of the engine of which rotating speed is increased with an increase in the rotating speed of the first rotating electric machine, at the time the engine is started up in an EV travel mode of transmitting the power of at least one of the first and second rotating electric machines to the drive wheel.

Further, in order to achieve the above mentioned object, a power transmission device for a hybrid vehicle according to the present invention includes a differential device configured to include a plurality of rotation components capable of performing differential rotation thereof and including a first rotation component to which a rotation shaft of an engine is connected and a second rotation component to which a rotation shaft of a first rotating electric machine is connected; a transmission device configured to include a first power transmission component to which a third rotation component of the differential device is connected and a second power transmission component to which a rotation shaft of the second rotating electric machine and a drive wheel are connected; a gear shift adjustment device configured to be able to control the transmission device to a neutral state where transmission of power between the first power transmission component and the second power transmission component is not allowed or to a state where the transmission of power between the first power transmission component and the second power transmission component is allowed; and a control device configured to include a first step of controlling the transmission device of the neutral state to a state where the transmission of power between the transmission component is allowed, a second step of increasing rotating speed of the first rotating electric machine, and a third step of controlling the start-up of the engine of which rotating speed is increased with an increase in the rotating speed of the first rotating electric machine, at the time the engine is started up in an EV travel mode of transmitting the power of at least one of the first and second rotating electric machines to the drive wheel.

It is desirable that the engine start-up control in the third step is ignition control to the engine.

Further, in order to achieve the above mentioned object, a hybrid system according to the present invention includes an engine; a first rotating electric machine; a second rotating electric machine; a transmission device configured to include a first power transmission component to which a rotation shaft of the engine is connected; a differential device configured to include a plurality of rotation components capable of performing differential rotation thereof and including a rotation component connected to a second power transmission component of the transmission device, a rotation component connected to a rotation shaft of the first rotating electric machine, and a rotation component connected to a rotation shaft of the second rotating electric machine and a drive wheel; a gear shift adjustment device configured to control the transmission device to a neutral state where transmission of power between the first power transmission component and the second power transmission component is not allowed at the time the vehicle travels in an EV travel mode of transmitting power of at least one of the first and second rotating electric machines to the drive wheel, and control the transmission device to a state where the transmission of power between the first power transmission component and the second power transmission component is allowed at the time the engine is started up in the EV travel mode; a rotating electric machine control device configured to increase the rotating speed of the first rotating electric machine after the transmission device is controlled to the power transmission state or during the control to the state at the time the engine is started up in the EV travel mode; and an engine control device configured to control the start-up of the engine of which rotating speed is increased with an increase in the rotating speed of the first rotating electric machine at the time the engine is started up in the EV travel mode.

Further, in order to achieve the above mentioned object, a hybrid system according to the present invention includes an engine; a first rotating electric machine; a second rotating electric machine; a differential device configured to include a plurality of rotation components capable of performing differential rotation thereof and including a first rotation component to which a rotation shaft of the engine is connected and a second rotation component to which a rotation shaft of the first rotating electric machine is connected; a transmission device configured to include a first power transmission component to which a third rotation component of the differential device is connected and a second power transmission component to which a rotation shaft of the second rotating electric machine and a drive wheel are connected; a gear shift adjustment device configured to control the transmission device to a neutral state where transmission of power between the first power transmission component and the second power transmission component is not allowed at the time the vehicle travels in an EV travel mode of transmitting the power of at least one of the first and second rotating electric machines to the drive wheel, and control the transmission device to a state where the transmission of power between the first power transmission component and the second power transmission component is allowed at the time the engine is started up in the EV travel mode; a rotating electric machine control device configured to increase rotating speed of the first rotating electric machine after the transmission device is controlled to the power transmission state or during the control to the state at the time the engine is started up in the EV travel mode; and an engine control device configured to control the start-up of the engine of which rotating speed is increased with an increase in the rotating speed of the first rotating electric machine at the time the engine is started up in the EV travel mode.

It is desirable that the start-up control of the engine of which the rotating speed is increased with an increase in the rotating speed of the first rotating electric machine is ignition control to the engine.

Here, it is desirable that the control to a state where the transmission of power between the first power transmission component and the second power transmission component is allowed at the time the engine is started up in the EV travel mode indicates gear shift control of shifting the transmission device to a target transmission gear ratio or a target gear shift stage after the start-up of the engine is completed in the transmission device.

Further, it is desirable that the transmission device completes the gear shift operation to the target transmission gear ratio or the target gear shift stage until the start-up of the engine is completed.

Further, it is desirable that the transmission device performs a gear shift operation to the target transmission gear ratio or the target gear shift stage in response to at least one of a vehicle speed, an accelerator operation amount, a throttle opening degree, and an accelerator operation speed.

Further, it is desirable that at the time a required vehicle driving force changes during the start-up of the engine, the transmission device performs a gear shift operation to a new target transmission gear ratio or a new target gear shift stage after the start-up of the engine is completed in response to the changed required vehicle driving force.

Further, it is desirable that at the time the gear shift operation to the target transmission gear ratio or the target gear shift stage is not completed during the start-up of the engine, the control device increases an output torque of the engine.

Further, it is desirable that the transmission device performs the gear shift operation to the target transmission gear ratio or the target gear shift stage at the time the required vehicle driving force is a predetermined value or more, and does not perform the gear shift operation to the target transmission gear ratio or the target gear shift stage at the time the required vehicle driving force is smaller than the predetermined value.

Advantageous Effects of Invention

Since the power transmission device for a hybrid vehicle and the hybrid system according to the present invention generate a shock in accordance with a gear shift operation during a start-up of an engine by performing a gear shift operation of a transmission device during the start-up of the engine, it is possible to suppress a two-stage shock from being generated by the gear shift operation after the start-up of the engine.

BRIEF DESCRIPTION OF DRAWINGS

FIG. 3 is a diagram illustrating an operation engagement table of the power transmission device for a hybrid vehicle and the hybrid system of the embodiment.

FIG. 19 is a diagram illustrating an operation engagement table of the power transmission device for a hybrid vehicle and the hybrid system of the fourth modified example.

DESCRIPTION OF EMBODIMENTS

Hereinafter, an embodiment of a power transmission device for a hybrid vehicle and a hybrid system according to the present invention will be described in detail with reference to the drawings. Furthermore, the present invention is not limited to the embodiment.

Embodiment

An embodiment of the power transmission device for a hybrid vehicle and the hybrid system according to the present invention will be described with reference to FIGS. 1 to 19.

Figure 1:
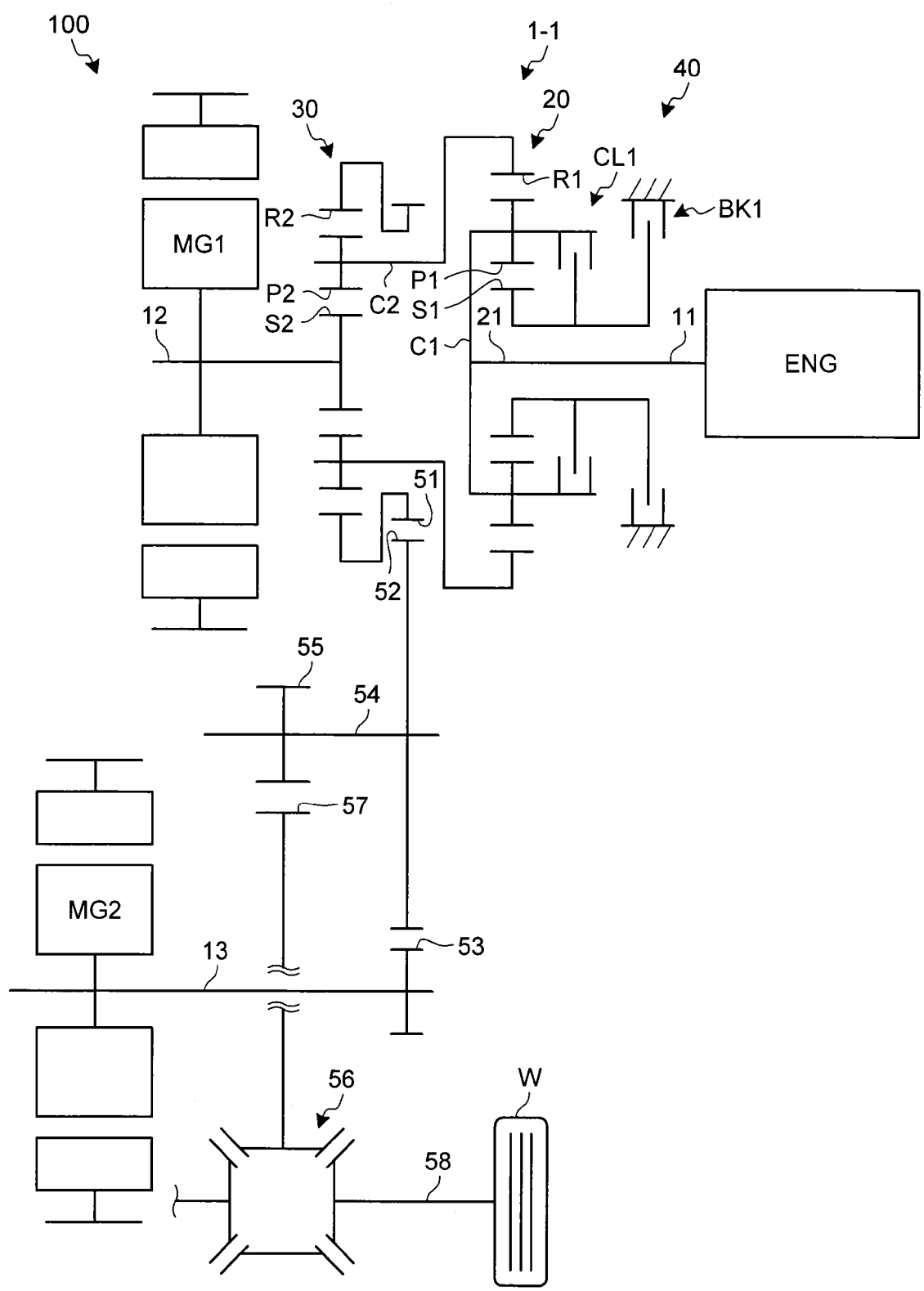
FIG. 1 is a skeleton diagram illustrating the configuration of a power transmission device for a hybrid vehicle and a hybrid system according to the present invention.

Reference Sign 1-1 of FIG. 1 indicates the hybrid system of the embodiment. Further, Reference Sign 100 of FIG. 1 indicates the hybrid vehicle equipped with a hybrid system 1-1.

The hybrid system 1-1 includes an engine ENG, a first rotating electric machine MG1, and a second rotating electric machine MG2 as power sources.

The engine ENG is an engine such as an internal-combustion engine or an external-combustion engine which outputs mechanical power (an engine torque) from an engine rotation shaft (a crank shaft) 11. The operation of the engine ENG is controlled by an electronic control unit (hereinafter, referred to as the "engine ECU") 91 as an engine control device illustrated in FIG. 2. The engine ECU 91 controls the output torque (hereinafter, referred to as the "engine torque") of the engine ENG by controlling, for example, an opening degree of an electronic throttle valve, ignition based on the output of an ignition signal, and injection of fuel.

Each of the first rotating electric machine MG1 and the second rotating electric machine MG2 is an electric generator (a motor/a generator) which has a function as an electric motor (a motor) for a power running drive operation and a function as a power generator (a generator) for a regeneration drive operation. The operations of the first and second rotating electric machines MG1 and MG2 are controlled by an electronic control unit (hereinafter, referred to as the "MGECU") 92 as a rotating electric machine control device illustrated in FIG. 2. The first and second rotating electric machines MG1 and MG2 are connected to a secondary battery (not illustrated) through an inverter (not illustrated), and convert mechanical energy (the rotation torque) input to the rotation shafts (an MG1 rotation shaft 12 and an MG2 rotation shaft 13) into electric energy so that the electric energy is stored in a secondary battery. Further, the first and second rotating electric machines MG1 and MG2 can convert the electric energy supplied from the secondary battery or the electric energy generated by the other rotating electric machine (the second and first rotating electric machines MG2 and MG1) into the mechanical energy (the rotation torque) and can output the mechanical power (the output torque) from the rotation shafts (the MG1 rotation shaft 12 and the MG2 rotation shaft 13). The MGECU 92 adjusts, for example, the value of the current supplied to the first rotating electric machine MG1 or the second rotating electric machine MG2 so as to control the output torque (hereinafter, referred to as the "MG1 torque") of the first rotating electric machine MG1 or the output torque (hereinafter, referred to as the "MG2 torque") of the second rotating electric machine MG2.

Further, the hybrid system 1-1 is equipped with a power transmission device which transmits power between the power sources and transmits the power between the power source and the drive wheel W. The power transmission device includes a transmission device 20 and a differential device 30 which are connected to each other in series. The hybrid system 1-1 of the embodiment is a multi-axial type in which the engine rotation shaft 11 and the MG1 rotation shaft 12 are coaxially disposed and the MG2 rotation shaft 13 is disposed with a gap therebetween. The hybrid system 1-1 has a configuration in which the transmission device 20 is disposed near the engine ENG and the differential device 30 is disposed near the first rotating electric machine MG1.

The transmission device 20 can transmit the rotation input from the engine ENG to the differential device 30 while changing the rotation speed thereof or can transmit the rotation input from the differential device 30 to the engine ENG while changing the rotation speed thereof. The transmission device 20 includes a first power transmission component which is connected to the engine ENG and transmits power from the engine ENG and a second power transmission component which is connected to the differential device 30 and transmits power from the differential device 30. The first power transmission component is a rotation shaft (a first rotation shaft) connected to the engine ENG or a rotation component to be described later. Further, the second power transmission component is a rotation shaft (a second rotation shaft) connected to the differential device 30 or a rotation component to be described later.

The transmission device 20 exemplified herein includes a planetary gear mechanism with a plurality of rotation components capable of performing a differential rotation. As the planetary gear mechanism, a single pinion type, a double pinion type, a Ravigneaux type, or the like can be employed. The transmission device 20 of the example is a differential device which includes one single pinion type planetary gear mechanism, and includes a sun gear S1, a ring gear R1, a plurality of pinion gears P1, and a carrier C1 as the rotation components thereof. In the transmission device 20, one of the sun gear S1, the ring gear R1, and the carrier C1 is connected to the engine ENG, and one of the rest is connected to the differential device 30. In this example, the engine ENG is connected to the carrier C1. The carrier C1 is connected to the engine rotation shaft 11 through a rotation shaft (a first rotation shaft) 21 so as to rotate along with the engine rotation shaft 11. Thus, in this example, the carrier C1 or the rotation shaft 21 becomes the first power transmission component. Further, in this example, the differential device 30 is connected to the ring gear R1. The ring gear R1 is the second power transmission component, and is connected to one (here, a carrier C2) of the rotation components of the differential device 30 so as to rotate together.

The hybrid system 1-1 is equipped with a gear shift adjustment device 40 which changes the transmission gear ratio or the gear stage of the transmission device 20. The transmission device 20 exemplified herein includes two gear stages as high and low stages, and is switched to the high and low gear stages or the neutral state by the gear shift adjustment device 40. Thus, the gear shift adjustment device 40 includes two engagement devices which adjust the rotation state or the stop state of a predetermined rotation component in the transmission device 20. In this example, the clutch CL1 and the brake BK1 are provided as the engagement devices. The engagement or release operations of the clutch CL1 and the brake BK1 are controlled by an HVECU 90 to be described later.

The clutch CL1 is a clutch device which connects or separates the sun gear S1 and the carrier C1, to or from each other. The clutch CL1 may be configured as, for example, a so-called friction engagement type clutch device or a meshing type clutch device. The clutch CL1 is engaged or released by the hydraulic pressure or the electric power, and includes a first engagement member that rotates along with the sun gear S1 and a second engagement member that rotates along with the carrier C1. The clutch CL1 exemplified herein is operated by the supply oil pressure adjusted by a hydraulic pressure adjustment device (not illustrated).

The clutch CL1 connects the sun gear S1 and the carrier C1 to each other by controlling the first engagement member and the second engagement member in the engagement state. The clutch CL1 in the half engagement state allows the relative rotation between the sun gear S1 and the carrier C1 while the first engagement member and the second engagement member are slid and are not rotated together. The clutch CL1 in the full engagement state integrates the sun gear S1 and the carrier C1 so that the relative rotation therebetween is not allowed. Thus, the clutch CL1 can prohibit the differential operation of the planetary gear mechanism of the transmission device 20 while being controlled in the full engagement state. Meanwhile, the clutch CL1 separates the sun gear S1 and the carrier C1 from each other so that the relative rotation thereof is allowed by controlling the first engagement member and the second engagement member in the release state. Thus, the clutch CL1 can allow the differential rotation of the rotation components of the transmission device 20 while being controlled in the release state.

The brake BK1 is a brake device which regulates the rotation of the sun gear S1. As in the clutch CL1, the brake BK1 may be configured as a friction engagement type or a meshing type. The brake BK1 is engaged or released by the hydraulic pressure or the electric power, and includes a first engagement member that rotates along with the sun gear S1 and a second engagement member that is fixed to a vehicle body (for example, the casing of the power transmission device). The brake BK1 exemplified herein is operated by the supply oil pressure adjusted by the hydraulic pressure adjustment device (not illustrated).

The brake BK1 regulates the rotation of the sun gear S1 by connecting the sun gear S1 to the vehicle body while the first engagement member and the second engagement member are controlled in the engagement state. The brake BK1 in the half engagement state regulates the rotation of the sun gear S1 as long as the rotation is not stopped while the first engagement member is slid on the second engagement member. The brake BK1 in the full engagement state prohibits the rotation of the sun gear S1. Meanwhile, the brake BK1 allows the rotation of the sun gear S1 by separating the sun gear S1 from the vehicle body while the first engagement member and the second engagement member are controlled in the release state.

The transmission device 20 becomes the neutral state when both the clutch CL1 and the brake BK1 are in the release state. The neutral state indicates a state where power can not be transmitted between the first rotation shaft 21 and the second rotation shaft (that is, the carrier C1 and the ring gear R1) as the input and output components of the transmission device 20 of the example. In the neutral state, the engine ENG and the differential device 30 are separated from each other so that the transmission of power therebetween is interrupted.

Meanwhile, the transmission device 20 becomes a connection state where power can be transmitted between the carrier C1 and the ring gear R1 (the engine ENG and the differential device 30) through the engagement of any one of the clutch CL1 and the brake BK1. Thus, since power can be transmitted between the engine ENG and the drive wheel W when any one of the clutch CL1 and the brake BK1 is engaged, the vehicle can travel by using the engine ENG as a power source, and an engine brake can be generated.

For example, the transmission device 20 performs a differential rotation while the sun gear S1 is fixed (so that the rotation is stopped) by releasing the clutch CL1 and engaging the brake BK1. At that time, the transmission device 20 outputs the rotation of the engine ENG input to the carrier C1 from the ring gear R1 without increasing the rotation speed thereof. That is, the transmission device 20 becomes an over-drive (OD) state in which the transmission gear ratio is smaller than 1 by releasing the clutch CL1 and engaging the brake BK1.

On the contrary, the transmission device 20 becomes a state where the differential rotation of all rotation components rotating together is prohibited by engaging the clutch CL1 and releasing the brake BK1, and hence the input and output components (the carrier C1 and the ring gear R1) are directly connected to each other. At that time, the transmission device 20 becomes a state where the transmission gear ratio is 1, and hence the rotation of the engine ENG input to the carrier C1 is output from the ring gear R1 at the constant speed without increasing the rotation speed thereof.

In this way, the transmission device 20 becomes a high speed gear stage (a high speed stage) by releasing the clutch CL1 and engaging the brake BK1, and becomes a low speed gear stage (a low speed stage) by engaging the clutch CL1 and releasing the brake BK1. In the hybrid system 1-1, since the transmission gear ratio of the transmission device 20 is 1 or less, there is no need to inevitably increase the torque of the first rotating electric machine MG1.

The differential device 30 includes a plurality of rotation components capable of performing a differential rotation, and includes a planetary gear mechanism with the rotation components. As the planetary gear mechanism, a single pinion type, a double pinion type, a Ravigneaux type, or the like can be employed. The differential device 30 of the example includes one single pinion type planetary gear mechanism, and includes a sun gear S2, a ring gear R2, a plurality of pinion gears P2, and a carrier C2 as the rotation components thereof. In the differential device 30, one of the sun gear S2, the ring gear R2, and the carrier C2 is connected to the engine ENG through the transmission device 20, one of the rest is connected to the first rotating electric machine MG1, and the last one is connected to the second rotating electric machine MG2 and the drive wheel W. In this example, the ring gear R1 of the transmission device 20 is connected to the carrier C2, the first rotating electric machine MG1 is connected to the sun gear S2, and the second rotating electric machine MG2 and the drive wheel W are connected to the ring gear R2. Here, the carrier C2 is a rotation component which is connected to the ring gear R1 so as to rotate along with the ring gear R1 of the transmission device 20, and becomes a power transmission component with respect to the transmission device 20. Further, the sun gear S2 is a rotation component which is connected to the MG1 rotation shaft 12 so as to rotate together, and becomes a power transmission component with respect to the first rotating electric machine MG1. Further, the ring gear R2 is a rotation component which is connected to the second rotating electric machine MG2 or the drive wheel W through a gear group below, and becomes a power transmission component with respect to the second rotating electric machine MG2 or the drive wheel W.

A counter drive gear 51 is connected to the ring gear R2 of the differential device 30 so as to rotate together while being disposed coaxially. The counter drive gear 51 engages with a counter driven gear 52 including a rotation shaft disposed while being deviated in parallel. The counter driven gear 52 engages with a reduction gear 53 including a rotation shaft disposed while being deviated in parallel. The reduction gear 53 is fixed onto the MG2 rotation shaft 13. Thus, power is transmitted between the counter driven gear 52 and the second rotating electric machine MG2 through the reduction gear 53. For example, the reduction gear 53 has a diameter smaller than the counter driven gear 52, and transmits the rotation of the second rotating electric machine MG2 to the counter driven gear 52 while decreasing the rotation speed thereof.

Further, the counter driven gear 52 is fixed onto a counter shaft 54. Here, the hybrid vehicle 100 of the example is assumed as an FF (Front Engine Front Drive) vehicle, an RR (Rear Engine Rear Drive) vehicle, or a four-wheel-drive vehicle based on the FF vehicle or the RR vehicle. For this reason, a drive pinion gear 55 is fixed onto the counter shaft 54. The counter driven gear 52 and the drive pinion gear 55 can rotate together through the counter shaft 54. The drive pinion gear 55 engages with a differential ring gear 57 of a differential device 56. The differential device 56 is connected to the drive wheels W through left and right drive shafts 58. For example, the hybrid system 1-1 can be decreased in size by disposing the drive pinion gear 55 and the differential ring gear 57 (that is, the differential device 56) between the second rotating electric machine MG2 and the reduction gear 53.

In the power transmission device of the hybrid system 1-1, the entire transmission gear ratio (in other words, the system transmission gear ratio of the hybrid system 1-1) including the transmission gear ratio of the transmission device 20 and the transmission gear ratio of the differential device 30 is determined. The system transmission gear ratio indicates the ratio between the input and output components of one power transmission device including the transmission device 20 and the differential device 30, and indicates the ratio (the deceleration ratio) of the input side rotating speed with respect to the output side rotating speed of the power transmission device. In this example, the ratio of the rotating speed of the carrier C1 of the transmission device 20 with respect to the rotating speed of the ring gear R2 of the differential device 30 becomes the system transmission gear ratio. Thus, in the power transmission device, the range of the transmission gear ratio is widened compared to the case where the transmission only includes the differential device 30.

Figure 2:
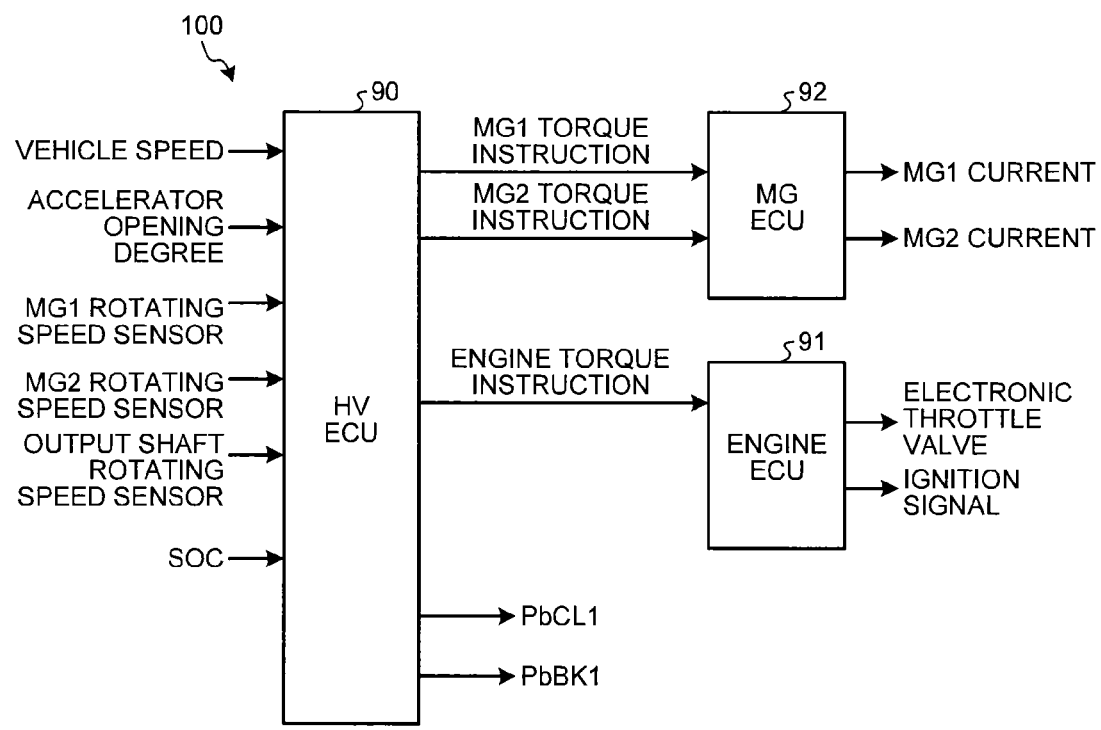
FIG. 2 is a diagram illustrating an input/output relation of an embodiment.

As illustrated in FIG. 2, the hybrid system 1-1 is equipped with the integrated ECU (hereinafter, referred to as the "HVECU") 90 which controls the engine ECU 91 and the MGECU 92 together and controls the entire system, and hence the control device of the system is configured.

Various sensors such as a vehicle speed sensor, an accelerator opening degree sensor, an MG1 rotating speed sensor, an MG2 rotating speed sensor, an output shaft rotating speed sensor, and a battery sensor are connected to the HVECU 90. The HVECU 90 acquires the vehicle speed, the accelerator opening degree, the rotating speed (the MG1 rotating speed) of the first rotating electric machine MG1, the rotating speed (the MG2 rotating speed) of the second rotating electric machine MG2, the rotating speed of the output shaft (for example, the rotation shaft of the ring gear R2 of the differential device 30) of the power transmission device, and the SOC (State Of Charge) of the secondary battery by various sensors.

The HVECU 90 calculates the required driving force, the required power, the required torque, and the like for the hybrid vehicle 100 based on the acquired information. The HVECU 90 calculates the required engine torque, the required MG1 torque, and the required MG2 torque based on, for example, the calculated required vehicle driving force. The HVECU 90 transmits the required engine torque to the engine ECU 91 so that the required engine torque is output to the engine ENG, and transmits the required MG1 torque and the required MG2 torque to the MGECU 92 so that the required MG1 torque and the required MG2 torque are output to the first rotating electric machine MG1 and the second rotating electric machine MG2.

Further, the HVECU 90 controls the clutch CL1 and the brake BK1 based on the travel mode and the like to be described later. At that time, the HVECU 90 outputs a supply oil pressure instruction value (PbCL1) for the clutch CL1 and a supply oil pressure instruction value (PbBK1) for the brake BK1 to the hydraulic pressure adjustment device. The hydraulic pressure adjustment device engages or releases the clutch CL1 and the brake BK1 by controlling the supply oil pressure in response to the instruction values PbCL1 and PbBK1.

In the hybrid system 1-1, an electric vehicle (EV) travel mode and a hybrid (HV) travel mode are set, and the hybrid vehicle 100 can travel in any one of the travel modes.

The EV travel mode is the travel mode which transmits the power of at least one of the first and second rotating electric machines MG1 and MG2 to the drive wheel W. The HV travel mode is the travel mode capable of performing a travel operation of transmitting only the power of the engine ENG to the drive wheel W and a travel operation of transmitting the power of the second rotating electric machine MG2 to the drive wheel W in addition to the power of the engine ENG.

FIG. 3 illustrates the operation engagement table of the hybrid system 1-1 for each travel mode. In the section of the clutch CL1 and the section of the brake BK1 of the operation engagement table, the circle indicates the engagement state, and the blank indicates the release state. Further, the triangle indicates a state where the brake BK1 becomes the release state when the clutch CL1 is the engagement state and the brake BK1 becomes the engagement state when the clutch CL1 is the release state. In the section of the first rotating electric machine MG1 and the section of the second rotating electric machine MG2 of the operation engagement table, "G" indicates a state where the generator is mainly used, and "M" indicates a state where the electric motor is mainly used.

[EV Travel Mode]

The EV travel mode can be classified into a single motor EV mode which uses only the second rotating electric machine MG2 as the power source and a dual motor EV mode which uses both the first and second rotating electric machines MG1 and MG2 as the power sources. In the hybrid system 1-1, for example, the single motor EV mode is selected in a low-load operation state and the dual motor EV mode is selected in a high-load operation state.

[Single Motor EV Mode]

Figure 4:
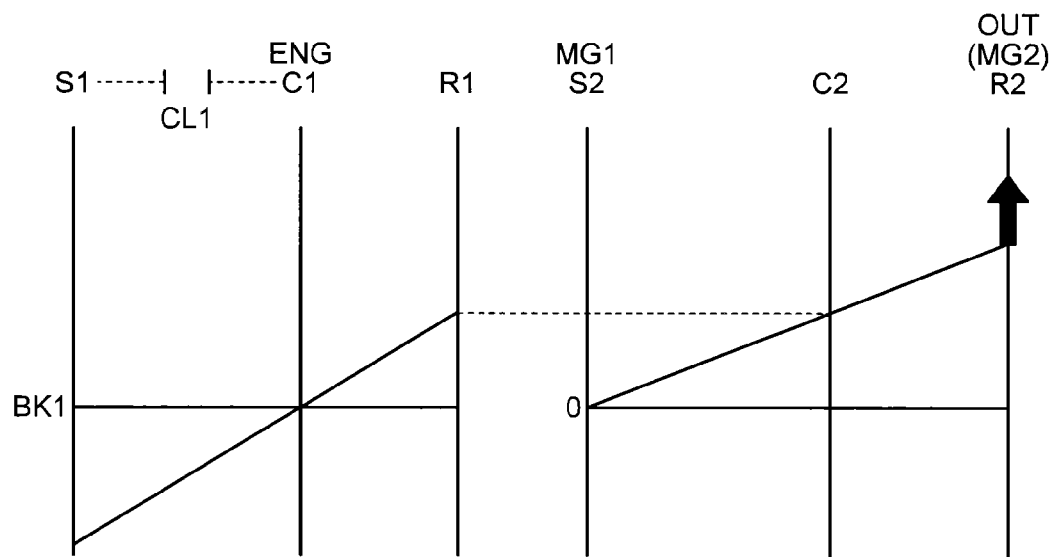
FIG. 4 is an alignment chart according to a single motor EV mode.

When the secondary battery can be charged based on the SOC in the single motor EV mode, the HVECU 90 does not need to consume electric power by the engine brake, and hence releases both the clutch CL1 and the brake BK1. Accordingly, the planetary gear mechanism of the transmission device 20 becomes the neutral state, and hence the differential rotation of the rotation components can be performed. In this case, the HVECU 90 generates a vehicle driving force in the hybrid vehicle 100 in the forward moving direction by outputting a positive MG2 torque in response to the required vehicle driving force to the MGECU 92 as the normal rotation of the second rotating electric machine MG2. The normal rotation indicates the rotation direction of the MG2 rotation shaft 13 or the ring gear R2 of the differential device 30 when the vehicle moves forward. FIG. 4 illustrates an alignment chart when the vehicle moves forward.

Here, since the ring gear R2 rotates normally while being interlocked with the rotation of the counter driven gear 52 when the vehicle moves forward in the single motor EV mode (without requiring the engine brake), there is a possibility that dragging loss may be generated in the first rotating electric machine MG1 in accordance with the differential rotation of the differential device 30. For this reason, the HVECU 90 reduces the dragging loss by operating the first rotating electric machine MG1 as the generator. Specifically, the HVECU 90 generates electric power by applying a slight torque to the first rotating electric machine MG1, and performs feed-back control so that the MG1 rotating speed becomes zero, thereby reducing the dragging loss of the first rotating electric machine MG1. Further, when the rotating speed of the first rotating electric machine MG1 can be maintained at zero without applying a torque to the first rotating electric machine MG1, the dragging loss of the first rotating electric machine MG1 can be reduced without applying a torque to the first rotating electric machine MG1. Further, in order to reduce the dragging loss of the first rotating electric machine MG1, the rotating speed of the first rotating electric machine MG1 may be set to zero by using the cogging torque of the first rotating electric machine MG1 or the d-axis locking. The d-axis locking indicates a state where the rotating speed of the first rotating electric machine MG1 is controlled at zero by the current generating a magnetic field for fixing a rotor supplied from an inverter to the first rotating electric machine MG1.

Further, when the vehicle moves forward, the ring gear R1 of the transmission device 20 also rotates normally along with the carrier C2. At that time, since the transmission device 20 becomes the neutral state where the clutch CL1 and the brake BK1 are released, the carrier C1 stops at the same time when the sun gear S1 revolves while rotating reversely, and the engine ENG is not rotated while the rotating speed thereof is zero. Thus, a large regeneration amount of the first rotating electric machine MG1 can be obtained when the vehicle moves forward. Further, the vehicle can travel while the engine ENG is stopped when the vehicle moves forward. Further, since the dragging loss is not caused by the rotation of the engine ENG in the EV travel mode when the vehicle moves forward, the fuel economy (the electric economy) can be improved.

Furthermore, if the secondary battery can be charged when the vehicle moves backward, both the clutch CL1 and the brake BK1 are released so that a negative MG2 torque in response to the required vehicle driving force is output to the second rotating electric machine MG2 by the reverse rotation, and hence a driving force is generated in the hybrid vehicle 100 in the backward moving direction. Even at that time, the HVECU 90 reduces the dragging loss of the first rotating electric machine MG1 as in the case where the vehicle moves forward.

Meanwhile, when the SOC is larger than a predetermined value and the charging of the secondary battery is prohibited in the single motor EV mode, the engine brake may be used together in the above-described drive state so that the secondary battery can be discharged. For this reason, in this case, when any one of the clutch CL1 and the brake BK1 is engaged as illustrated in FIG. 3, the engine ENG is rotated, and hence the engine brake is generated. At that time, the HVECU 90 increases the engine rotating speed by the control of the first rotating electric machine MG1.

[Dual Motor EV Mode]

Figure 5:
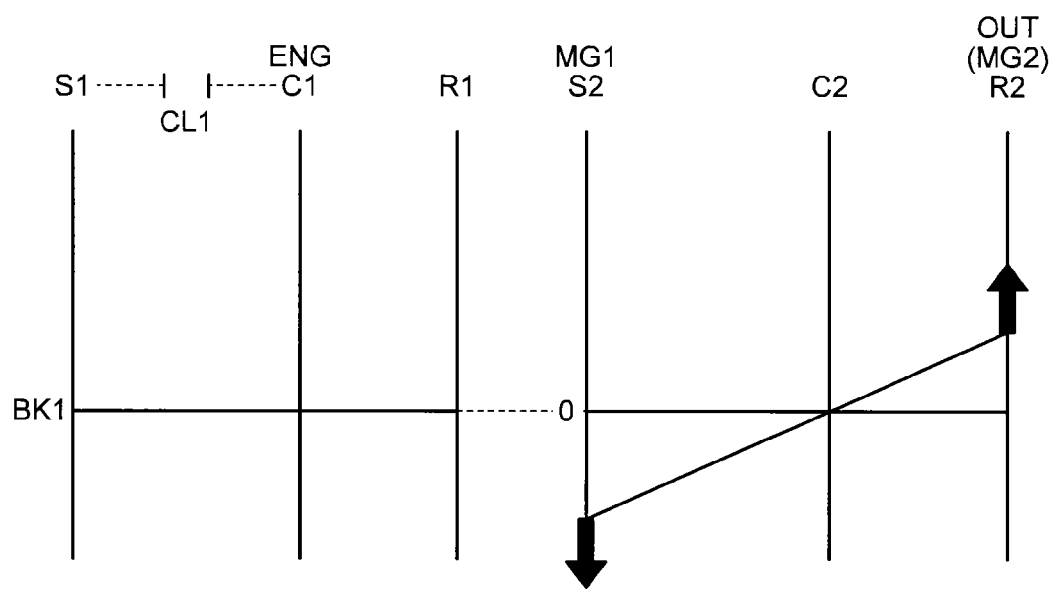
FIG. 5 is an alignment chart according to a dual motor EV mode.

In the dual motor EV mode, the HVECU 90 engages both the clutch CL1 and the brake BK1. Accordingly, in the transmission device 20, the differential rotation of the planetary gear mechanism is prohibited in accordance with the engagement of the clutch CL1 and the rotation of the sun gear S1 is prohibited in accordance with the engagement of the brake BK1, so that all rotation components of the planetary gear mechanism are stopped. For this reason, the rotating speed of the engine ENG becomes zero. Further, since the ring gear R1 is stopped, the carrier C2 connected to the ring gear R1 of the differential device 30 is also stopped, and hence the carrier C2 is locked so that the rotating speed becomes zero. FIG. 5 illustrates an alignment chart at this time.

The HVECU 90 outputs an MG1 torque and an MG2 torque to the first rotating electric machine MG1 and the second rotating electric machine MG2 in response to the required vehicle driving force. Here, since the rotation of the carrier C2 at that time is stopped, a reaction force with respect to the MG1 torque can be obtained. Thus, the differential device 30 can output the MG1 torque from the ring gear R2. If a negative MG2 torque is output to the first rotating electric machine MG1 by the reverse rotation when the vehicle moves forward, a positive torque can be output from the ring gear R2. Meanwhile, if a positive MG2 torque is output to the first rotating electric machine MG1 when the vehicle moves backward, a negative torque can be output from the ring gear R2.

Furthermore, if the secondary battery can be charged when the vehicle moves backward, both the clutch CL1 and the brake BK1 are engaged and the carrier C1 of the transmission device 20 is fixed, so that the vehicle may travel by the power of both the first rotating electric machine MG1 and the second rotating electric machine MG2.

[HV Travel Mode]

Figure 6:
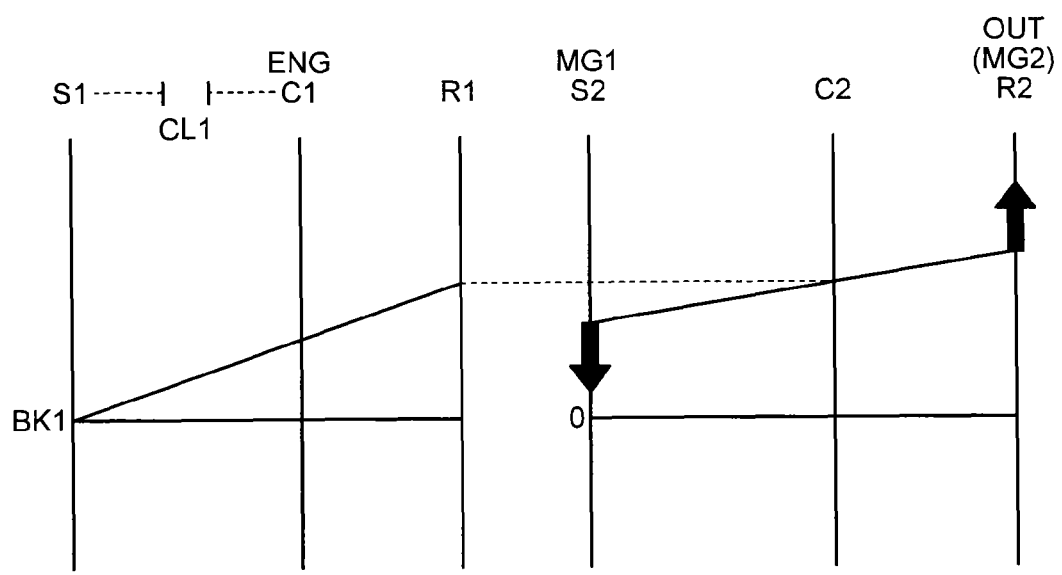
FIG. 6 is an alignment chart according to an HV high mode.
Figure 7:
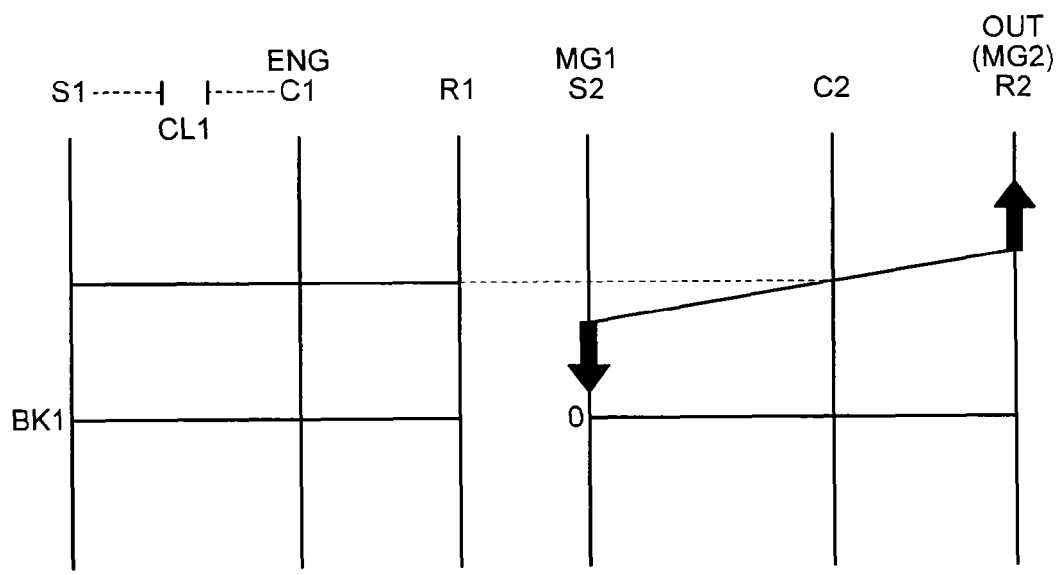
FIG. 7 is an alignment chart according to an HV low mode.

In the HV travel mode, the vehicle travels by transmitting only the engine torque or both the engine torque and the MG2 torque to the drive shaft 58 while acquiring a reaction force by the first rotating electric machine MG1. The engine torque which is transmitted to the drive shaft 58 at that time is called a so-called direct engine delivery torque, and is mechanically transmitted from the engine ENG to the drive shaft 58 without using the electric path. The HV travel mode can be classified into the travel mode (hereinafter, referred to as the "HV high mode") in which the transmission device 20 is switched to the high speed stage and the travel mode (hereinafter, referred to as the "HV low mode") in which the transmission device 20 is switched to the low speed stage. In the hybrid system 1-1 of the example, the HV high mode capable of reducing the circulation of the power is selected when the vehicle travels at the high vehicle speed, and the HV low mode is selected when the vehicle travels at the middle and low vehicle speeds. FIG. 6 illustrates an alignment chart in the HV high mode. Further, FIG. 7 illustrates an alignment chart in the HV low mode. In the HV travel mode, the differential device 30 can basically perform the differential rotation, and the gear stage of the transmission device 20 is switched by the control of the states (the engagement state or the release state) of the clutch CL1 and the brake BK1.

In the HV high mode, the HVECU 90 performs control in which the rotation of the engine ENG is output while the rotation speed thereof is increased after the transmission device 20 is switched to the high speed stage by the release of the clutch CL1 and the engagement of the brake BK1. Meanwhile, in the HV low mode, the HVECU 90 performs control in which the rotation of the engine ENG is output at the constant speed after the transmission device 20 is switched to the low speed stage by the engagement of the clutch CL1 and the release of the brake BK1.

The HV low mode is used when the vehicle moves backward. When the vehicle moves backward, the first rotating electric machine MG1 is operated as the generator and the second rotating electric machine MG2 is operated as the electric motor so that the second rotating electric machine MG2 is rotated in a direction opposite to the forward moving direction.

The HVECU 90 performs cooperative gear shift control of simultaneously shifting the transmission device 20 and the differential device 30 when the HV high mode and the HV low mode are switched. In the cooperative gear shift control, one transmission gear ratio of the transmission device 20 and the differential device 30 is increased, and the other transmission gear ratio is decreased.

Specifically, when the HVECU 90 switches the HV high mode to the HV low mode, the transmission gear ratio of the differential device 30 is changed to the high gear side in synchronization with the gear shift operation to the low speed stage of the transmission device 20 so that the system transmission gear ratio in the gear shift operation is maintained at a constant value. On the contrary, when the HVECU 90 switches the HV low mode to the HV high mode, the transmission gear ratio of the differential device 30 is changed to the low gear side in synchronization with the gear shift operation to the high speed stage of the transmission device 20 so that the system transmission gear ratio in the gear shift operation is maintained at a constant value. In this way, since a non-continuous change of the system transmission gear ratio is suppressed or reduced in the hybrid system 1-1, the engine rotating speed adjustment amount with the gear shift operation is decreased or the adjustment of the engine rotating speed with the gear shift operation is not needed.

After the HV low mode is selected, the HVECU 90 continuously changes the system transmission gear ratio to the low gear side by, for example, the control of the transmission gear ratio of the differential device 30. Meanwhile, after the HV high mode is selected, the HVECU 90 continuously changes the system transmission gear ratio to the high gear side by, for example, the control of the transmission gear ratio of the differential device 30. The control of the transmission gear ratio of the differential device 30 is performed by, for example, the control of the rotating speed of the first rotating electric machine MG1 or the second rotating electric machine MG2. In the hybrid system 1-1, the transmission system in the entire system is configured by the transmission device 20, the differential device 30, the first rotating electric machine MG1, the clutch CL1, and the brake BK1. For this reason, these configurations can be used in an electric continuously variable transmission of which the system transmission gear ratio is continuously changed by the electric control of the rotation of the first rotating electric machine MG1.

Figure 8:
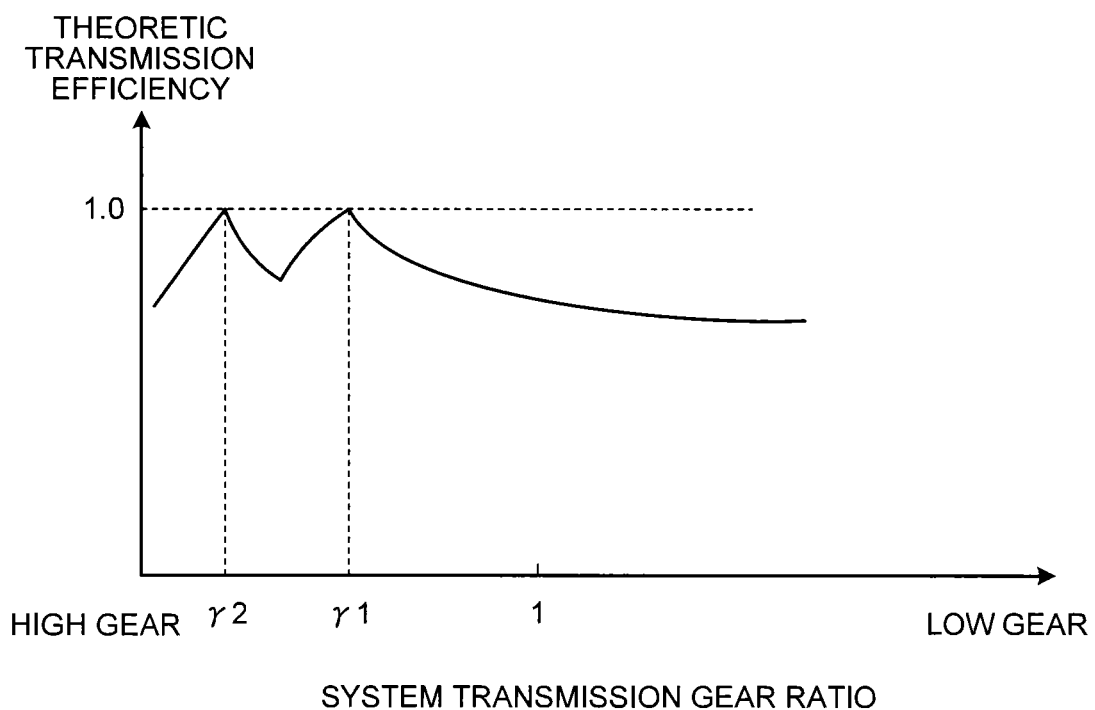
FIG. 8 is a diagram illustrating a theoretic transmission efficiency line.

FIG. 8 is a diagram illustrating a theoretic transmission efficiency line in the HV travel mode and illustrating a theoretic transmission efficiency line when the HV high mode is switched to the HV low mode. In this drawing, the horizontal axis indicates the system transmission gear ratio, and the vertical axis indicates the theoretic transmission efficiency in the HV travel mode. In the HV travel mode, a high efficient travel mode is selected from the HV high mode and the HV low mode, for example, at the same transmission gear ratio by using the theoretic transmission efficiency line.

Regarding the theoretic transmission efficiency, the maximum efficiency becomes 1.0 when the power input to the power transmission device is transmitted to the counter drive gear 51 through the mechanical transmission without using the electric path. In the theoretic transmission efficiency of the HV low mode, the maximum efficiency of the system transmission gear ratio becomes 1.0 at the transmission gear ratio $\gamma 1$. The transmission gear ratio $\gamma 1$ becomes the overdriver side system transmission gear ratio ($\gamma 1 < 1$). Further, in the theoretic transmission efficiency of the HV high mode, the maximum efficiency of the system transmission gear ratio becomes 1.0 at the transmission gear ratio $\gamma 2$. The transmission gear ratio $\gamma 2$ becomes the high gear side transmission gear ratio ($\gamma 2 < \gamma 1$) in relation to the transmission gear ratio $\gamma 1$. When the system transmission gear ratio is the transmission gear ratio $\gamma 1$ or the transmission gear ratio $\gamma 2$, the rotating speed of the first rotating electric machine MG1 (the sun gear S2) becomes zero. For this reason, when the system transmission gear ratio is the transmission gear ratio γ1 or the transmission gear ratio γ2, the electric path in which the first rotating electric machine MG1 receives the reaction force becomes zero, and hence power can be transmitted from the engine ENG to the counter drive gear 51 according to only the transmission of the mechanical power. Hereinafter, the transmission gear ratio γ1 is referred to as the "first mechanical transmission gear ratio γ1". Further, the transmission gear ratio γ2 is referred to as the "second mechanical transmission gear ratio γ2".

As obvious from FIG. 8, the theoretic transmission efficiency of the HV travel mode decreases as the system transmission gear ratio becomes the low gear side value in relation to the first mechanical transmission gear ratio γ1. Further, the theoretic transmission efficiency decreases as the system transmission gear ratio becomes the high gear side value in relation to the second mechanical transmission gear ratio γ2. Further, the theoretic transmission efficiency is curved to the low-efficiency side in an area of the transmission gear ratio between the first mechanical transmission gear ratio γ1 and the second mechanical transmission gear ratio γ2.

In this way, the power transmission device of the hybrid system 1-1 includes two mechanical points (the first mechanical transmission gear ratio γ1 and the second mechanical transmission gear ratio γ2) in an area where the system transmission gear ratio is located at the high gear side in relation to 1. Then, since the transmission device 20, the clutch CL1, and the brake BK1 are provided in the power transmission device, a separate mechanical point (the second mechanical transmission gear ratio γ2) can be generated at the high gear side in relation to the mechanical point (the first mechanical transmission gear ratio γ1) in the case where the engine ENG is directly connected to the carrier C2 of the differential device 30. Thus, in the hybrid system 1-1, it is possible to improve the transmission efficiency at the high gear in the HV travel mode, and hence to improve the fuel economy when the vehicle travels at the high vehicle speed.

Figure 9:
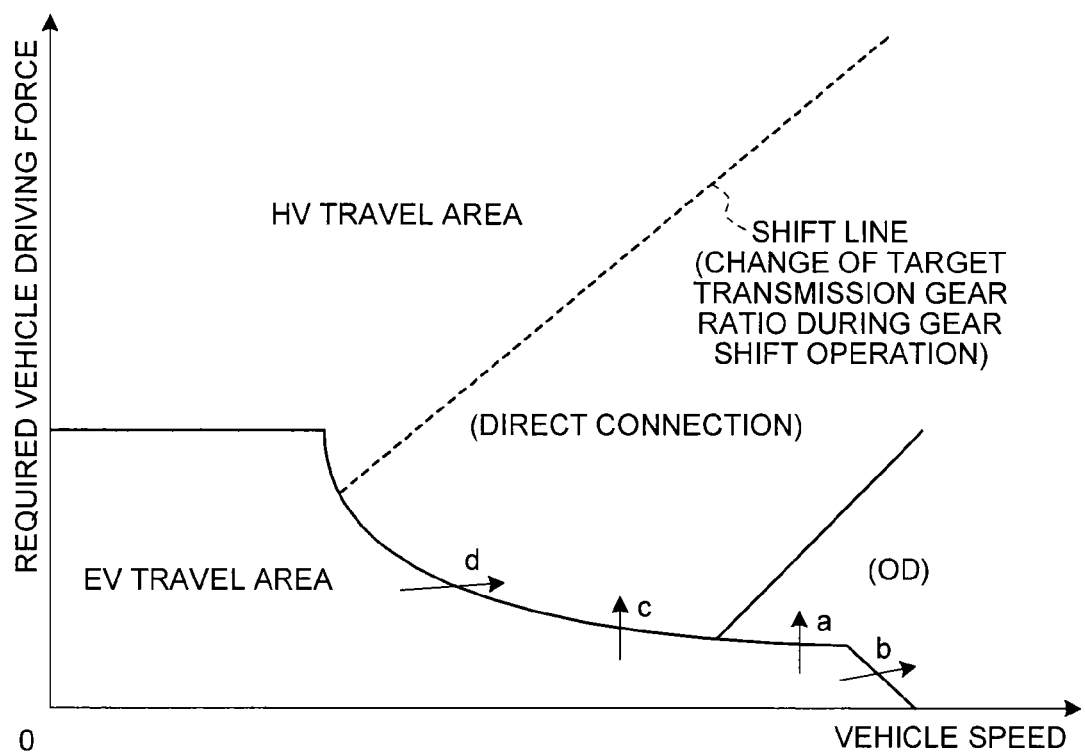
FIG. 9 is a diagram illustrating an EV travel area and an HV travel area.

Here, FIG. 9 illustrates an example of the corresponding relation of the vehicle speed, the required vehicle driving force, and the travel mode. In the hybrid system 1-1, as illustrated in FIG. 9, the EV travel mode is performed when the vehicle speed is low and the required vehicle driving force is in the low-load state. Here, the EV travel area is narrowed to the low-load point as the vehicle speed increases in response to the output characteristics of the first rotating electric machine MG1 or the second rotating electric machine MG2. In other words, when the vehicle speed is high and the required vehicle driving force is in the low-load state, the transmission device 20 is controlled in the over-drive state (the high speed stage) by the release of the clutch CL1 and the engagement of the brake BK1, and hence the fuel economy is improved in the HV travel mode. In the remaining area (that is, when the required vehicle driving force is in the middle-load state and the high-load state regardless of the vehicle speed and when the vehicle speed is middle and the required vehicle driving force is in the low-load state), the transmission device 20 is controlled in the direct connection state (the low speed stage) so as to enter the HV travel mode by the engagement of the clutch CL1 and the release of the brake BK1. Furthermore, even when the vehicle speed is high and the required vehicle driving force is in the low-load state, the transmission device 20 is controlled in the direct connection state as the vehicle speed decreases.

The HVECU 90 starts up the stopped engine ENG when the EV travel mode is switched to the HV travel mode. For example, when the HVECU 90 determines that the EV travel mode needs to be switched to the HV travel mode in accordance with an increase in the required vehicle driving force or an increase in the vehicle speed, the HVECU requires the start-up of the engine ENG for the engine ECU 91.

Then, in the hybrid system 1-1, when the HV travel mode (the HV high mode or the HV low mode) selected based on the vehicle speed or the required vehicle driving force is determined, the target gear shift stage (the target transmission gear ratio) of the transmission device 20 is determined after the completion of the start-up of the engine in response to the HV travel mode. When the HV high mode is selected, the high speed stage (the over-drive state) is required by the release of the clutch CL1 and the engagement of the brake BK1 as the target gear shift stage (the target transmission gear ratio) of the transmission device 20 after the completion of the start-up of the engine (see the arrows a and b of FIG. 9). Further, when the HV low mode is selected, the low speed stage (the direct connection state) is required by the engagement of the clutch CL1 and the release of the brake BK1 as the target gear shift stage (the target transmission gear ratio) of the transmission device 20 after the completion of the start-up of the engine (see the arrows c and d of FIG. 9).

When the current EV travel mode is the single motor EV mode (without needing the engine brake), the transmission device 20 selects the target gear shift stage (the target transmission gear ratio) in response to the selected HV travel mode in that the current state is the neutral state. Further, when the current EV travel mode is the single motor EV mode also using the engine brake, the transmission device 20 selects the target gear shift stage (the target transmission gear ratio) when the current gear stage is different from the target gear shift stage (the target transmission gear ratio) in response to the selected HV travel mode in that the current stage is the high speed stage or the low speed stage. Further, when the current EV travel mode is the dual motor EV mode, the transmission device 20 selects the target gear shift stage (the target transmission gear ratio) in response to the selected HV travel mode in that both the clutch CL1 and the brake BK1 are engaged.

In this way, in the hybrid system 1-1, there is a case in which the gear shift operation of the transmission device 20 may be required when the EV travel mode is switched to the HV travel mode. Then, when the gear shift operation of the transmission device 20 is required, the gear shift control of the transmission device 20 is performed after the start-up of the engine ENG is completed. When a shock is generated in accordance with the gear shift control of the transmission device 20 after a shock is generated in accordance with the engine start-up control, a so-called two-stage shock is generated. As a result, there is a concern that drivability may be degraded. Furthermore, for example, when the engine ENG is a gasoline engine, the engine start-up control indicates various kinds of control necessary for the start-up of the engine ENG, and various kinds of control include engine rotating speed increase control, air intake amount control using throttle valve opening degree control, fuel injection control, and ignition control using an ignition plug. Further, there is a possibility that the gear shift operation of the transmission device 20 after the start-up of the engine may generate a large shock compared to the gear shift operation of the stopped engine. Particularly, when the single motor EV mode is switched to the HV travel mode, there is a need to engage the clutch CL1 or the brake BK1. Accordingly, the gear shift shock increases compared to the case where the current mode is switched from the dual motor EV mode of releasing the clutch CL1 or the like.

Therefore, the HVECU 90 of the embodiment shifts the transmission device 20 to the target gear shift stage (the target transmission gear ratio) in the transmission device 20 after the completion of the start-up of the engine when the engine is started up in the EV travel mode. Here, for example, the time until the ignition ends from the start-up of the engine ENG is required with the driver's accelerator operation or the like (that is, the determination that the start-up of the engine ENG is needed after the detection of the start-up of the engine ENG) is referred to as the engine start-up time.

Here, the HVECU 90 starts the start-up of the engine ENG, for example, after the gear shift operation to the target gear shift stage (the target transmission gear ratio) is started after the start-up of the engine in the transmission device 20 is started. In order to suppress the two-stage shock, it is desirable to operate the clutch CL1 or the brake BK1 as the engagement target of the transmission device 20 in response to the target gear shift stage (the target transmission gear ratio) in at least the half engagement state during the engine start-up control (that is, until the start-up of the engine ENG is completed). In the transmission device 20, a shock may be easily generated when the first engagement member and the second engagement member of the clutch CL1 or the brake BK1 in the release state are connected to each other. Then, a shock is not easily generated even when the supply oil pressure is increased after the half engagement state. Further, it is desirable that the transmission device 20 may complete the gear shift operation during the engine start-up control by engaging the clutch CL1 or the brake BK1 of the engagement target in response to the target gear shift stage (the target transmission gear ratio) in the half engagement state during the engine start-up control in order to suppress the generation of the two-stage shock with high precision.

Figure 10:
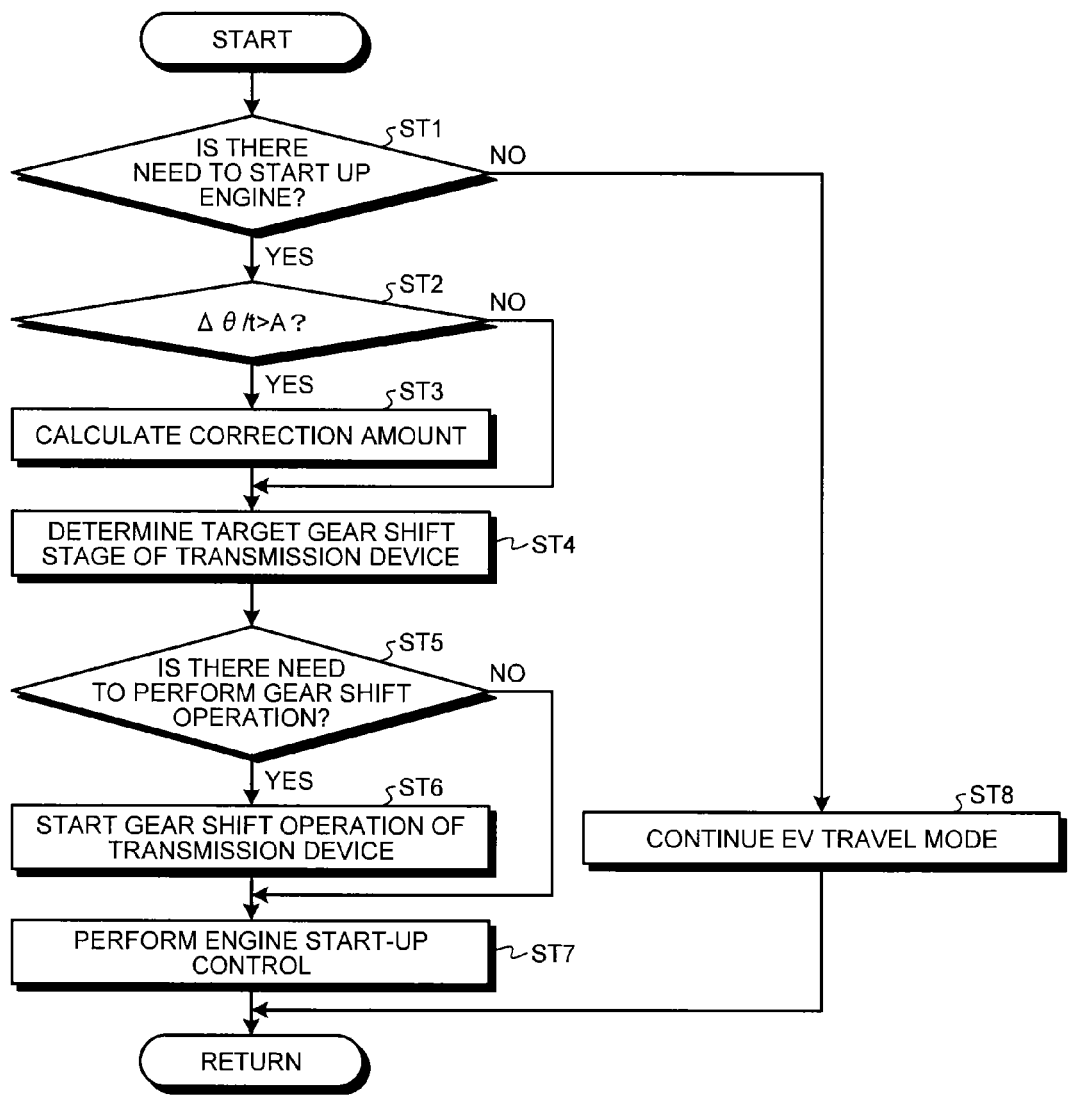
FIG. 10 is a flowchart illustrating an operation when an engine is started up in an EV travel mode of the embodiment.

Hereinafter, a calculation process when the engine ENG is started up in the EV travel mode will be described with respect to the flowchart of FIG. 10 and the time chart of FIG. 11.

Figure 11:
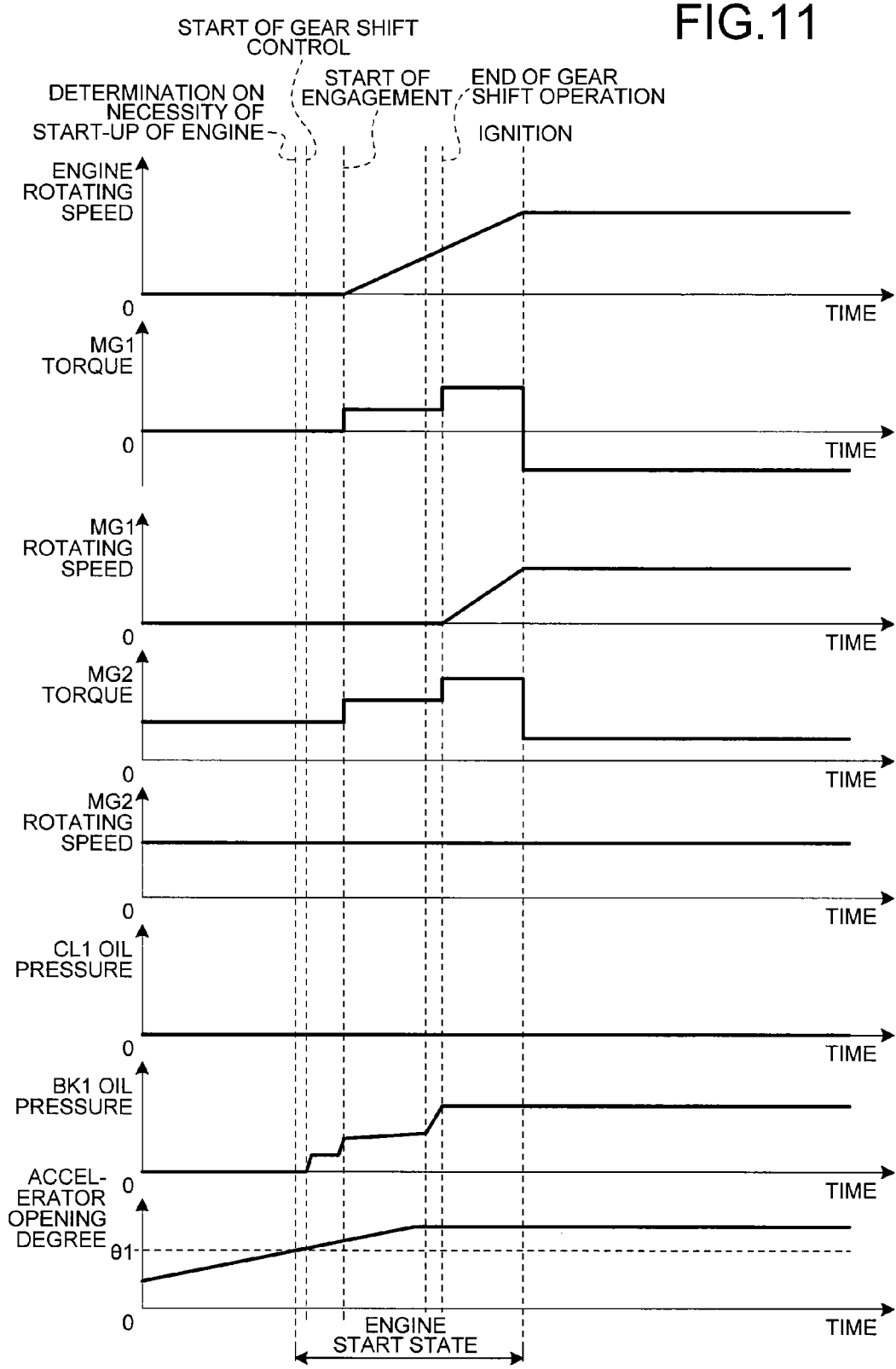
FIG. 11 is a time chart illustrating an operation when an engine is started up in an EV travel mode of the embodiment.

As illustrated in the time chart of FIG. 11, the hybrid vehicle 100 of the example outputs a positive MG2 torque only by the normal rotation of the second rotating electric machine MG2, and both the clutch CL1 and the brake BK1 are maintained in the release state in that the control oil pressure (CL1 oil pressure) of the clutch CL1 and the control oil pressure (BK1 oil pressure) of the brake BK1 are zero. Accordingly, the vehicle travels while the transmission device 20 is in the neutral state and the current mode is the single motor EV mode using the power of the second rotating electric machine MG2.

The HVECU 90 determines whether the engine ENG needs to be started up or not in the EV travel mode (step ST1).

In step ST1, when the switching from the EV travel mode to the HV travel mode is required, it is determined that the start-up of the engine ENG is needed. Meanwhile, when the switching is not required, it is determined that the start-up of the engine ENG is not needed. That is, this determination is based on the accelerator opening degree $\theta$ obtained by the driver's accelerator depressing amount or the driver's accelerator operation or the throttle opening degree obtained in response to the drive request in the automatic travel control (in the state where cruise control or the like is performed). Alternatively, this determination is performed based on the required vehicle driving force in response to the accelerator depressing amount or the throttle opening degree. In the time chart of FIG. 11, the accelerator opening degree $\theta$ gradually increases with the driver's accelerator operation in the EV travel mode. Then, when the accelerator opening degree $\theta$ increases to a predetermined opening degree $\theta 1$, it is determined that the start-up of the engine ENG is needed. When the HVECU 90 determines that the start-up of the engine ENG is not needed, the routine proceeds to step ST8 so that the EV travel mode is continued.

In the HVECU 90, the target gear shift stage of the transmission device 20 is set after the engine is started up (after the travel mode is switched) by using a value (the accelerator depressing amount or the required vehicle driving force) used in the determination of step ST1. This setting may be performed along with, for example, the determination of step ST1. Furthermore, the target gear shift stage set herein is temporarily set, and may be changed in response to the accelerator opening degree change rate $\Delta\theta/t$ below.

When the HVECU 90 determines that the start-up of the engine ENG is needed, it is determined whether the accelerator opening degree change rate $\Delta\theta/t$ is larger than a predetermined value A (step ST2). In step ST2, the determination may be performed by the accelerator steeping operation speed instead of the accelerator opening degree change rate $\Delta\theta/t$.

For example, when the accelerator opening degree change rate $\Delta\theta/t$ is small, the accelerator opening degree $\theta$ does not increase largely compared to the determination in step ST2. Thus, there is a low possibility that the required vehicle driving force may largely increase compared to the case of the determination on whether the start-up of the engine ENG is needed or not. On the contrary, when the accelerator opening degree change rate $\Delta\theta/t$ is large, the accelerator opening degree $\theta$ largely increases compared to the determination of step ST2. Thus, there is a high possibility that the required vehicle driving force largely increases compared to the case of the determination on whether the start-up of the engine ENG is needed or not. Then, for example, in the case of the switching of the arrow a of FIG. 9, the required vehicle driving force largely increases, and hence there is a case in which the target gear shift stage of the transmission device 20 after the start-up of the engine needs to be switched from the high speed stage of the over-drive state to the low speed stage of the direct connection state. Therefore, in this example, the determination of step ST2 is performed so as to determine whether the target gear shift stage of the transmission device 20 after the start-up of the engine may be set in the state of the determination on whether the start-up of the engine ENG is needed or not. For this reason, the predetermined value A may be set from the viewpoint of, for example, the determination on whether the required vehicle driving force largely increases as much as the target gear shift stage of the transmission device 20 is changed. In this example, when the vehicle speed is lower than the case of the switching of the arrow a of FIG. 9, there is a possibility that the target gear shift stage of the transmission device 20 may be switched from the high speed stage to the low speed stage due to the required vehicle driving force increasing by a small amount compared to the case of the switching. Thus, the predetermined value A may be set to a value which increases as the vehicle speed increases in the high vehicle speed area. Here, it is desirable that the accelerator opening degree change rate $\Delta\theta/t$ be calculated as the recent value from the time point at which it is determined that at least the start-up of the engine ENG is needed due to the purpose of the determination in step ST2.

When the HVECU 90 determines that the target gear shift stage of the transmission device 20 is not changed in that the accelerator opening degree change rate Δθ/t is the predetermined value A or less and the accelerator depressing amount is not largely increased, the routine proceeds to step ST4 to be described later, and the target gear shift stage of the transmission device 20 is determined. Meanwhile, when the HVECU 90 determines that the target gear shift stage of the transmission device 20 is changed in that the accelerator opening degree change rate Δθ/t is larger than the predetermined value A and the accelerator depressing amount is largely increased, the correction amount of the value (the required vehicle driving force or the like) used to determine the target gear shift stage of the transmission device 20 is calculated (step ST3).

Figure 12:
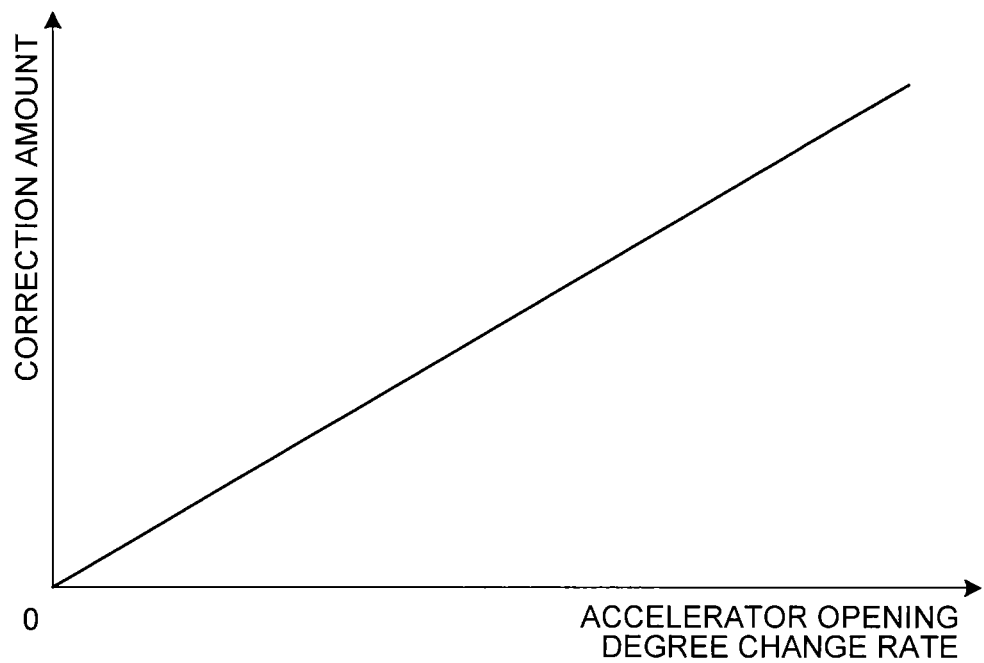
FIG. 12 is a diagram illustrating an example of a correction amount.

As illustrated in FIG. 12, the correction amount is set so that the correction amount increases as the accelerator opening degree change rate Δθ/t increases. The correction amount may be a correction value which is added to a value used to determine the target gear shift stage of the transmission device 20 after the start-up of the engine or a correction coefficient which is multiplied by the value.

The HVECU 90 determines the target gear shift stage of the transmission device 20 after the engine is started up (the travel mode is switched) (step ST4).

In step ST4, when the accelerator opening degree change rate Δθ/t is the predetermined value A or less, the target gear shift stage which is set in the determination on whether the start-up of the engine ENG is needed or not is determined as the target gear shift stage of the transmission device 20 after the start-up of the engine. Further, when the correction amount is calculated in step ST3, a value used to determine the target gear shift stage of the transmission device 20 is corrected by the correction amount, and the target gear shift stage of the transmission device 20 after the start-up of the engine is determined based on the corrected value. For example, when the required vehicle driving force is corrected in the determination on whether the start-up of the engine ENG is needed, the HVECU 90 compares the corrected required vehicle driving force and the current vehicle speed with the map of FIG. 9. Then, when the over-drive state is required by the corrected required vehicle driving force and the current vehicle speed, the HVECU 90 determines the high speed stage as the target gear shift stage of the transmission device 20 after the start-up of the engine. Meanwhile, when the direct connection state is required, the HVECU 90 determines the low speed stage as the target gear shift stage of the transmission device 20 after the start-up of the engine.

The HVECU 90 determines whether the transmission device 20 needs to be shifted or not (step ST5).

For example, in the transmission device 20, there is a case in which the determined target gear shift stage is the same as the actual gear stage in the EV travel mode. For this reason, in this example, it is determined whether the gear shift operation of the transmission device 20 is needed by comparing the target gear shift stage determined in step ST4 with the actual gear stage of the EV travel mode. In the time chart of FIG. 11, it is determined that the gear shift operation is needed since the neutral state needs to be changed to the over-drive state.

When the HVECU 90 determines that the gear shift operation is not needed, the routine proceeds to step ST7 to be described later so as to perform the start-up control of the engine ENG. Since the engine ENG in this example is a gasoline engine, ignition control which is performed at last among various kinds of control in the engine start-up control is performed in this case. Meanwhile, when the HVECU 90 determines that the gear shift operation is not needed, the gear shift operation to the target gear shift stage of the transmission device 20 is started (step ST6).

In step ST6, control is started so that only any one of the clutch CL1 and the brake BK1 becomes the engagement state based on the target gear shift stage. In the time chart of FIG. 11, since the gear shift operation is performed from the neutral state to the over-drive state, the gear shift control of the transmission device 20 is started as the BK1 oil pressure starts to increase. At that time, since the engagement members of the brake BK1 start to engage with each other when the BK1 oil pressure exceeds a predetermined value, the gear shift operation of the transmission device 20 is actually started along with the engagement. Furthermore, here, the BK1 oil pressure is further increased when the brake BK1 is switched from the half engagement state to the full engagement state.

In the hybrid system 1-1, when the gear shift operation of the transmission device 20 is actually started and the clutch CL1 or the brake BK1 becomes the half engagement state, the transmission device 20 becomes a state where power can be transmitted between the input and output components (between the first power transmission component and the second power transmission component), and hence power can be transmitted between the first rotating electric machine MG1 and the engine ENG and between the second rotating electric machine MG2 and the engine ENG. For this reason, the HVECU 90 performs the start-up control of the engine ENG (step ST7). Since the engine ENG of the example is a gasoline engine, ignition control which is performed at last among various kinds of control in the engine start-up control is performed in step ST7. After the transmission device 20 is controlled in a state where power can be transmitted in this way, the HVECU 90 increases the rotating speed of the first rotating electric machine MG1 and performs the ignition control when the engine rotating speed increases to the rotating speed at which the ignition can be performed in the engine ENG of which the rotating speed is increased with an increase in the rotating speed of the first rotating electric machine MG1. At that time, an increase in the rotating speed of the first rotating electric machine MG1 is started after at least the clutch CL1 or the brake BK1 becomes the half engagement state. That is, an increase in the rotating speed may be started after the clutch CL1 or the brake BK1 becomes the full engagement state. Further, the HVECU 90 may increase the rotating speed of the first rotating electric machine MG1 before the engagement of the clutch CL1 or the brake BK1 (that is, during the control in which power may be transmitted in the transmission device 20) when the shock generated by the engagement does not excessively increase. In this case, since the rotating speed of the engine ENG may be increased by the rotation of the first rotating electric machine MG1 when power may be transmitted in the transmission device 20, the ignition control is performed by increasing the engine rotating speed to the rotating speed at which the ignition may be performed in the engine ENG of which the rotating speed is increased.

In the hybrid system 1-1, when the gear shift operation of the transmission device 20 is actually started, the rotation of the second rotating electric machine MG2 is transmitted to the engine rotation shaft 11 through the differential device 30 or the transmission device 20 so that the engine rotating speed starts to increase. For this reason, the HVECU 90 acquires a reaction force by the first rotating electric machine MG1. Further, the HVECU 90 causes even the second rotating electric machine MG2 to receive a reaction force so that a change in torque does not occur in the output side (for example, the drive wheel W or the ring gear R2 of the differential device 30). In the time chart of FIG. 11, when the gear shift operation of the transmission device 20 is started, the BK1 oil pressure is increased so that the brake BK1 is maintained in the half engagement state and a positive MG1 torque is output and a positive MG2 torque is increased so that the first rotating electric machine MG1 and the second rotating electric machine MG2 receive a reaction force. The sequence control is performed without performing the engine rotating speed increase control using the MG1 torque until the brake BK1 is completely engaged.

In the time chart of FIG. 11, when the gear shift operation to the target gear shift stage of the transmission device 20 is completed with the full engagement of the brake BK1, the rotating speed of the first rotating electric machine MG1 is increased by the normal rotation, and the rotation is transmitted to the engine rotation shaft 11 through the differential device 30 and the transmission device 20 so as to increase the rotating speed of the rotation of the engine ENG. At that time, a positive MG1 torque is output to the first rotating electric machine MG1 while increasing the positive MG1 torque, and an MG2 torque is increased by the reaction force amount so that the reaction force is received by the second rotating electric machine MG2. Subsequently, when the engine rotating speed increases to a predetermined rotating speed in which the ignition may be performed, the HVECU 90 ignites the engine ENG and adjusts the MG1 torque and the MG2 torque so as to suppress a change in the vehicle driving force caused by the generation of the engine torque. Here, the MG1 rotating speed is stopped at the rotating speed for the ignition of the engine, a negative MG1 torque is generated in the first rotating electric machine MG1, and the MG2 torque of the second rotating electric machine MG2 is decreased in a positive value.

In this way, in the hybrid system 1-1 and the power transmission device, if the current gear stage (the transmission gear ratio) of the transmission device 20 is different from the target gear shift stage (the target transmission gear ratio) after the completion of the start-up of the engine when the engine ENG is started up in the EV travel mode, the gear shift operation to the target gear shift stage (the target transmission gear ratio) is started, and then the engine rotating speed is increased at the MG1 torque to the rotating speed at which the ignition may be performed. Accordingly, the gear shift operation of the transmission device 20 to the target gear shift stage (the target transmission gear ratio) after the completion of the start-up of the engine is performed during the start-up of the engine. For this reason, since the gear shift shock of the transmission device 20 is generated along with the shock caused by the start-up of the engine ENG in the hybrid system 1-1 and the power transmission device, it is possible to prevent the generation of the two-stage shock in which the shock is generated twice. Further, since the gear shift operation of the transmission device 20 is performed during the start-up of the engine in the hybrid system 1-1 and the power transmission device, the gear shift shock decreases compared to the case where the gear shift operation of the transmission device 20 is performed immediately after the start-up of the engine. Thus, the hybrid system 1-1 and the power transmission device can suppress the number of times of the shock and the degree of the shock immediately after the start-up of the engine from the request of the start-up of the engine. Accordingly, in the hybrid system 1-1 and the power transmission device, it is possible to promptly end the start-up of the engine and the gear shift operation of the transmission device 20 to the target gear shift stage (the target transmission gear ratio) after the completion of the start-up of the engine while reducing a shock. Thus, it is possible to generate the required vehicle driving force with good responsiveness compared to the case where the gear shift operation of the transmission device 20 is performed immediately after the start-up of the engine, and hence to suppress degradation in drivability.

Incidentally, in the hybrid system 1-1, the engine rotating speed is increased by the first, rotating electric machine MG1. However, when the engine rotating speed becomes equal to or larger than the rotating speed at which the ignition can be performed, it is desirable not to increase the rotating speed of the first rotating electric machine MG1 for increasing the engine rotating speed. For example, the fuel economy (the electric economy) can be improved.

Further, when the clutch CL1 or the brake BK1 becomes the half engagement state, it is desirable to increase the engine rotating speed of the first rotating electric machine MG1 before the clutch CL1 or the brake BK1 is completely engaged (that is, before the gear shift operation of the transmission device 20 is completed).

First Modified Example

Incidentally, for example, when the driver further steps on the accelerator pedal during the gear shift operation of the transmission device 20, there is a case in which the target gear shift stage (the target transmission gear ratio) after the completion of the start-up of the engine may be changed in response to the accelerator depressing amount. Then, if the gear shift operation is continuously performed when the target gear shift stage (the target transmission gear ratio) is changed, the gear shift operation to the new target gear shift stage (the target transmission gear ratio) is performed immediately after the start-up of the engine, and hence there is a possibility that the two-stage shock can be generated. Thus, when the gear shift operation of the transmission device 20 to the target gear shift stage (the target transmission gear ratio) after the completion of the start-up of the engine is performed during the gear shift operation of the transmission device 20, it is desirable that the HVECU 90 promptly select the new target gear shift stage (the target transmission gear ratio). For example, in FIG. 9, an example of the shift line when the target gear shift stage (the target transmission gear ratio) is changed during the gear shift operation is indicated by the dashed line. For example, the shift line can be obtained by an experiment or a simulation based on the viewpoint of the start-up of the engine (the shock caused by the start-up of the engine ENG) and the gear shift operation (the gear shift shock or the responsiveness until the completion of the gear shift operation) of the transmission device 20.

Figure 13:
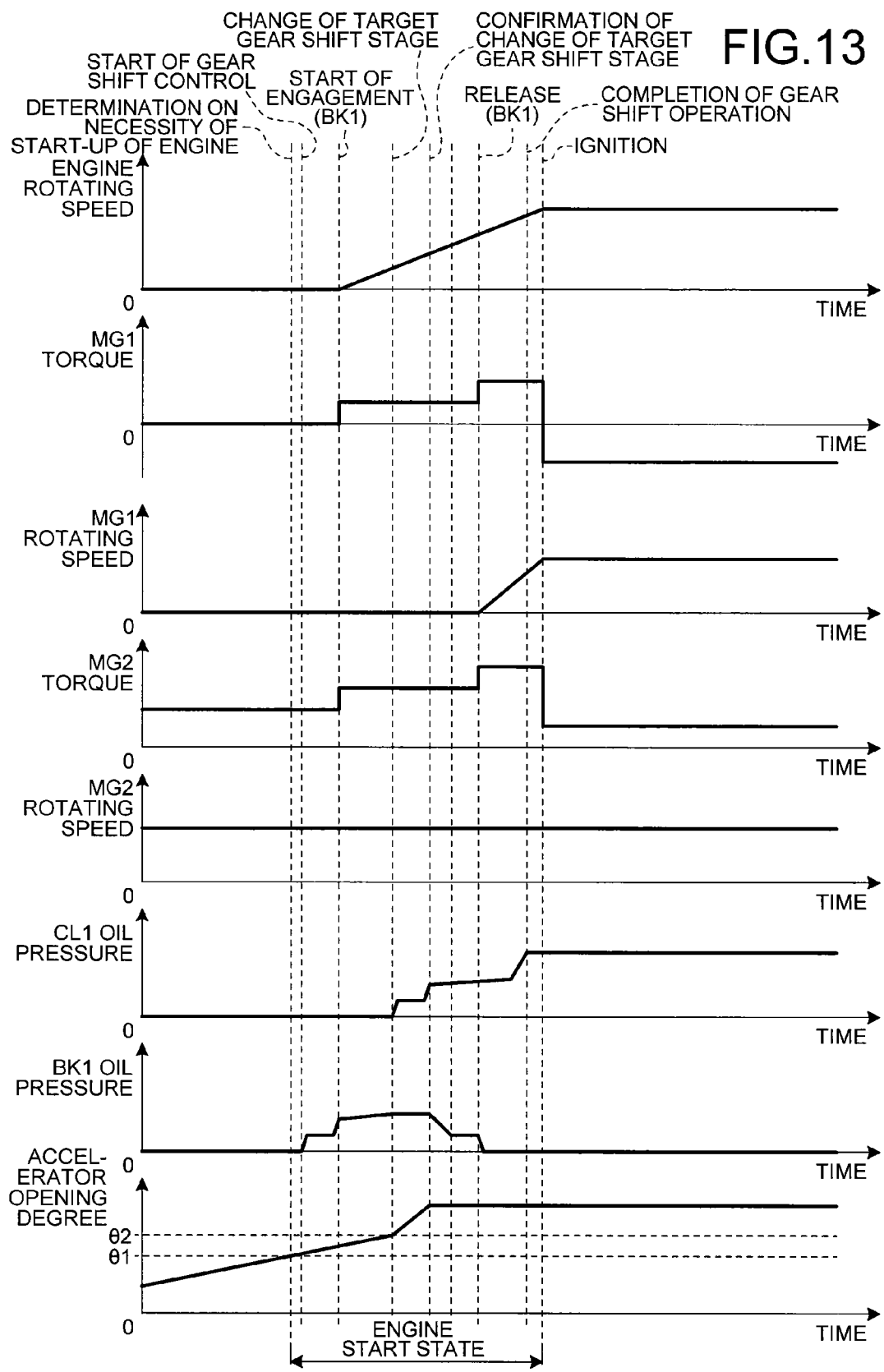
FIG. 13 is a time chart illustrating an operation when an engine is started up in an EV travel mode of a first modified example.

The time chart of FIG. 13 indicates a case where the target gear shift stage after the completion of the start-up of the engine is changed from the high speed stage (the over-drive state) to the low speed stage (the direct connection state) during the gear shift operation with an increase in the required vehicle driving force when the accelerator pedal is stepped on so as to become larger than a predetermined opening degree θ2 (>θ1).

In this case, the HVECU 90 determines the target gear shift stage of the transmission device 20 after the completion of the start-up of the engine based on the required vehicle driving force in response to the accelerator opening degree θ and the correction amount in response to the accelerator opening degree change rate Δθ/t when the accelerator opening degree θ becomes a predetermined opening degree θ2 or the required vehicle driving force becomes a value in response to the predetermined opening degree θ2, compares the new target gear shift stage with the current target gear shift stage, and determines that the target gear shift stage is switched from the high speed stage to the low speed stage. Accordingly, the HVECU 90 decreases the BK1 oil, pressure in response to the high speed stage and increases the CL1 oil pressure in response to the low speed stage, so that the brake BK1 to be engaged in the full engagement state is released and the clutch CL1 of the release state is engaged. In the hybrid system 1-1, the reaction force is continuously obtained by the first rotating electric machine MG1 and the second rotating electric machine MG2 similarly to the above-described embodiment in the meantime.

Here, in this example, the CL1 oil pressure is increased when the change of the target gear shift stage is determined. However, the BK1 oil pressure is not immediately decreased, and the BK1 oil pressure is maintained at the value obtained by the determination of the change. Accordingly, for example, there is a possibility that the target gear shift stage can be changed after the accelerator pedal is stepped on so that the accelerator opening degree increases and then the accelerator pedal is immediately returned. However, since the BK1 oil pressure does not decrease at this time, it is possible to perform the full engagement of the brake BK1, that is, the gear shift operation to the high speed stage with good responsiveness. The BK1 oil pressure is maintained until the operation of steeping on the accelerator pedal so that the accelerator opening degree increases ends. Then, when the operation of stepping on the accelerator pedal ends and the accelerator opening degree θ obtained at the end of the operation is maintained, the HVECU 90 determines that the gear shift operation to the low speed stage is confirmed, and hence decreases the BK1 oil pressure. The brake BK1 is switched from the half engagement state to the release state at a predetermined hydraulic pressure with a decrease in the BK1 oil pressure.

When the brake BK1 is released, the hybrid system 1-1 increases the rotation of the first rotating electric machine MG1 by the normal rotation even when the clutch CL1 is still in the half engagement state, and transmits the rotation to the engine rotation shaft 11 through the differential device 30 and the transmission device 20 so as to increase the rotation speed of the rotation of the engine ENG. At that time, a positive MG1 torque is output to the first rotating electric machine MG1 while increasing the positive MG1 torque thereof, and an MG2 torque is increased by the reaction force amount so that the reaction force is received by the second rotating electric machine MG2. Subsequently, when the engine rotating speed increases to a predetermined rotating speed in which the ignition may be performed, the HVECU 90 ignites the engine ENG and adjusts the MG1 torque and the MG2 torque so as to suppress a change in the vehicle driving force caused by the generation of the engine torque. Here, the MG1 rotating speed is stopped at the rotating speed for the ignition of the engine, a negative MG1 torque is generated in the first rotating electric machine MG1, and the MG2 torque of the second rotating electric machine MG2 is decreased in a positive value. In this example, the clutch CL1 becomes the full engagement state before the ignition of the engine ENG, and the gear shift operation of the transmission device 20 to the target gear shift stage after the completion of the start-up of the engine is completed.

In this way, in the hybrid system 1-1 and the power transmission device, when the target gear shift stage (the target transmission gear ratio) after the completion of the start-up of the engine is changed during the gear shift operation of the transmission device 20, the gear shift operation performed so far is immediately stopped, and the gear shift operation to the new target gear shift stage (the target transmission gear ratio) is started. Accordingly, the gear shift operation can be performed during the start-up of the engine. For this reason, since the hybrid system 1-1 and the power transmission device generate the gear shift shock of the transmission device 20 along with the shock generated by the start-up of the engine ENG even in this case, it is possible to prevent a problem in which the shocks are generated continuously. Further, in the hybrid system 1-1 and the power transmission device, since the gear shift operation of the transmission device 20 is performed during the start-up of the engine even in this case, the gear shift shock decreases compared to the case where the gear shift operation of the transmission device 20 is performed immediately after the start-up of the engine. Thus, even when the target gear shift stage (the target transmission gear ratio) after the completion of the start-up of the engine is changed during the gear shift operation of the transmission device 20, the hybrid system 1-1 and the power transmission device can suppress the number of times of the shock and the degree of the shock immediately after the start-up of the engine from the request of the start-up of the engine, and hence can further suppress degradation in drivability.

Here, when the determination on the change of the target gear shift stage (the target transmission gear ratio) is late, the gear shift operation of the transmission device 20 to the new target gear shift stage (the target transmission gear ratio) may not be completed until the ignition of the engine ENG. However, in the hybrid system 1-1 and the power transmission device, since the clutch CL1 is operated to at least the half engagement state until the ignition of the engine ENG, the generation of the gear shift shock immediately after the start-up of the engine can be suppressed.

Second Modified Example

Incidentally, the gear shift shock after the start-up of the engine increases by the required vehicle driving force. For this reason, when the accelerator pedal is stepped on again so that the accelerator opening degree increases as in the first modified example, the required vehicle driving force increases with an increase in the accelerator opening degree θ. Accordingly, it is desirable to perform the gear shift operation of the transmission device 20 to the target gear shift stage (the target transmission gear ratio) after the completion of the start-up of the engine during the start-up of the engine and to improve the output responsiveness of the required vehicle driving force while preventing the continuous generation of the shocks plural times. However, meanwhile, in the hybrid system 1-1, there is a concern that the gear shift shock may be generated with respect to two target gear shift stages (two target transmission gear ratios) at least before and after the start-up of the engine and a large shock may be generated along with the shock caused by the start-up of the engine ENG.

Therefore, in the hybrid system 1-1 and the power transmission device of the second modified example, the target gear shift stage (the target transmission gear ratio) is changed only when the required vehicle driving force is larger than a predetermined value during the determination on the change of the target gear shift stage (the target transmission gear ratio). Thus, in the hybrid system 1-1 and the power transmission device, the change of the target gear shift stage (the target transmission gear ratio) is allowed during the gear shift operation of the transmission device 20 in the start-up of the engine when the required vehicle driving force is larger than a predetermined value, and the change of the target gear shift stage (the target transmission gear ratio) during the gear shift operation is prohibited when the required vehicle driving force is a predetermined value or less. The predetermined value is the required vehicle driving force capable of allowing the gear shift shock immediately after the start-up of the engine, and may be set to the maximum value. In this example, the required vehicle driving force of the shift line indicated by the dashed line of FIG. 9 may be used as the predetermined value. Furthermore, the allowance is set based on, for example, the condition in which the generation of the shock does not give an uncomfortable feeling to the driver.

When the required vehicle driving force is larger than a predetermined value, the hybrid system 1-1 shifts the transmission device 20 to the new target gear shift stage (the target transmission gear ratio) after the change of the start-up of the engine. Accordingly, since the hybrid system 1-1 can end the start-up of the engine and the gear shift operation of the transmission device 20 in a short time, it is possible to improve the output responsiveness of the required vehicle driving force while preventing the generation of the large gear shift shock immediately after the start-up of the engine. Meanwhile, when the required vehicle driving force is a predetermined value or less, the hybrid system 1-1 continues the gear shift operation to the original target gear shift stage (the target transmission gear ratio) during the start-up of the engine and performs the gear shift operation to the new target gear shift stage (the target transmission gear ratio) after the gear shift operation is completed. For this reason, at this time, there is a possibility that the gear shift shock may be generated immediately after the start-up of the engine by the gear shift operation to the new target gear shift stage (the target transmission gear ratio) after the completion of the start-up of the engine. However, at this time, since the required vehicle driving force is a predetermined value or less, the generation of the large gear shift shock immediately after the start-up of the engine is prevented.

In this example, it is determined whether the new target gear shift stage (the target transmission gear ratio) needs to be changed based on the degree of the required vehicle driving force. However, the determination may be performed based on, for example, the accelerator opening degree $\theta$. That is, in the hybrid system 1-1, the change of the target gear shift stage (the target transmission gear ratio) during the gear shift operation of the transmission device 20 in the start-up of the engine may be allowed when the accelerator opening degree $\theta$ is larger than a predetermined opening degree $\theta3$ (the accelerator opening degree $\theta$ corresponding to a predetermined value in the required vehicle driving force), and the change of the target gear shift stage (the target transmission gear ratio) during the gear shift operation may be prohibited when the accelerator opening degree $\theta$ is the predetermined opening degree $\theta3$ or less.

In the hybrid system 1-1, when the required vehicle driving force is larger than the predetermined value or the accelerator opening degree $\theta$ is larger than the predetermined opening degree $\theta3$, the transmission device 20 may be shifted to the target gear shift stage (the target transmission gear ratio) after the completion of the start-up of the engine during the start-up of the engine. Meanwhile, when the required vehicle driving force is a predetermined value or less or the accelerator opening degree $\theta$ is the predetermined opening degree $\theta3$ or less, the transmission device 20 may be shifted to the target gear shift stage (the target transmission gear ratio) after the completion of the start-up of the engine after the start-up of the engine is completed. In this case, when the required vehicle driving force is larger than a predetermined value, it is possible to improve the output responsiveness of the required vehicle driving force while preventing the large gear shift shock immediately after the start-up of the engine. On the contrary, the gear shift operation of the transmission device 20 is not performed during the start-up of the engine when the required vehicle driving force is a predetermined value or less, and the gear shift operation to the target gear shift stage (the target transmission gear ratio) is performed after the completion of the start-up of the engine. However, the generation of the large gear shift shock immediately after the start-up of the engine can be prevented.

Third Modified Example

When the gear shift operation to the new target gear shift stage (the target transmission gear ratio) different from the current gear shift stage is performed during the gear shift operation of the transmission device 20, the torque which is transmitted from the differential device 30 to the transmission device 20 is directed to the direction opposite to the rotation direction of the torque caused by the gear shift operation, and hence there is a possibility that the gear shift operation becomes tardy. Therefore, in the hybrid system 1-1 and the power transmission device of the third modified example, the operation time until the completion of the gear shift operation is shortened by increasing the engine torque in a manner such that the engine ENG is started up during the gear shift operation to the new target gear shift stage (the target transmission gear ratio).

Figure 14:
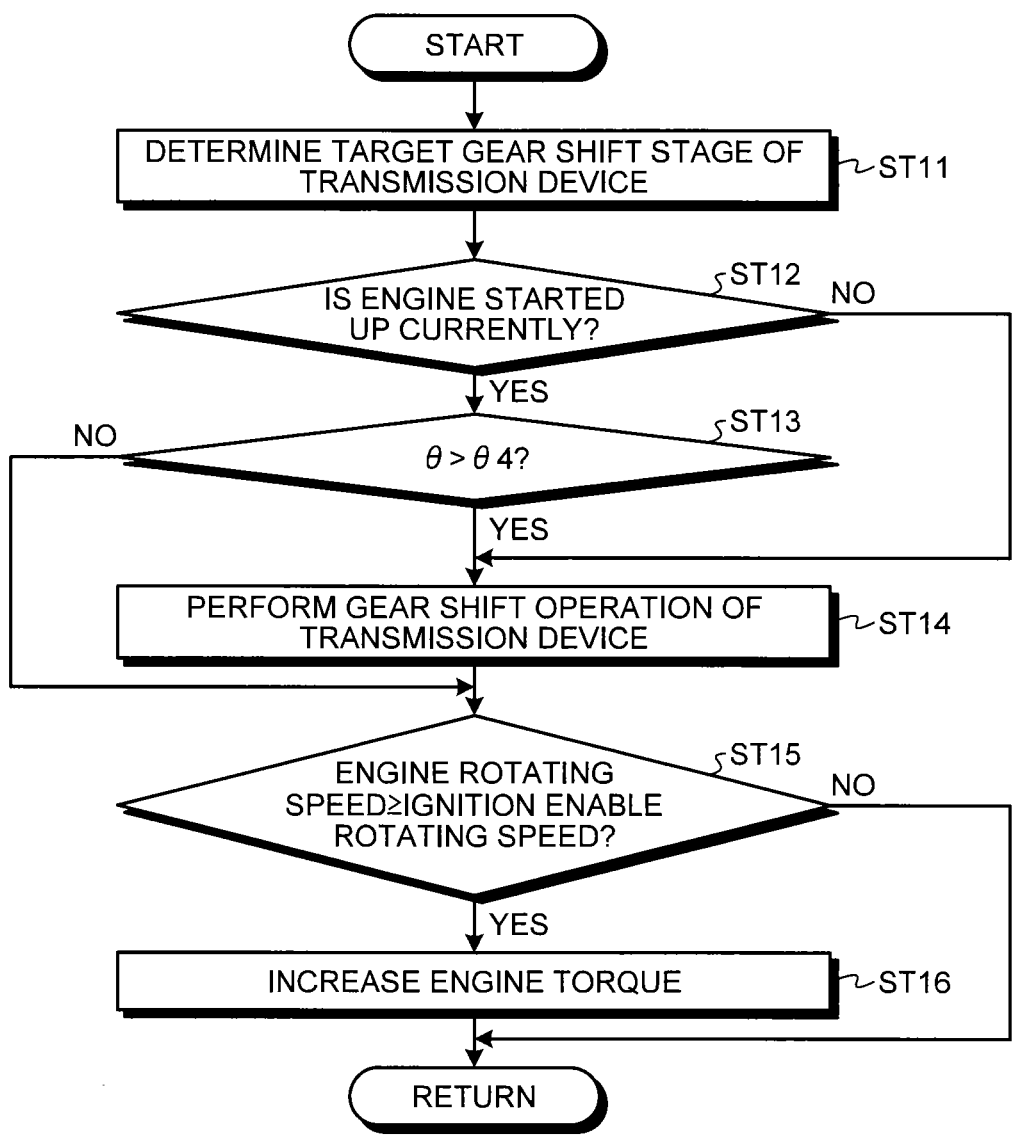
FIG. 14 is a flowchart illustrating an operation when an engine is started up in an EV travel mode of a third modified example.
Figure 15:
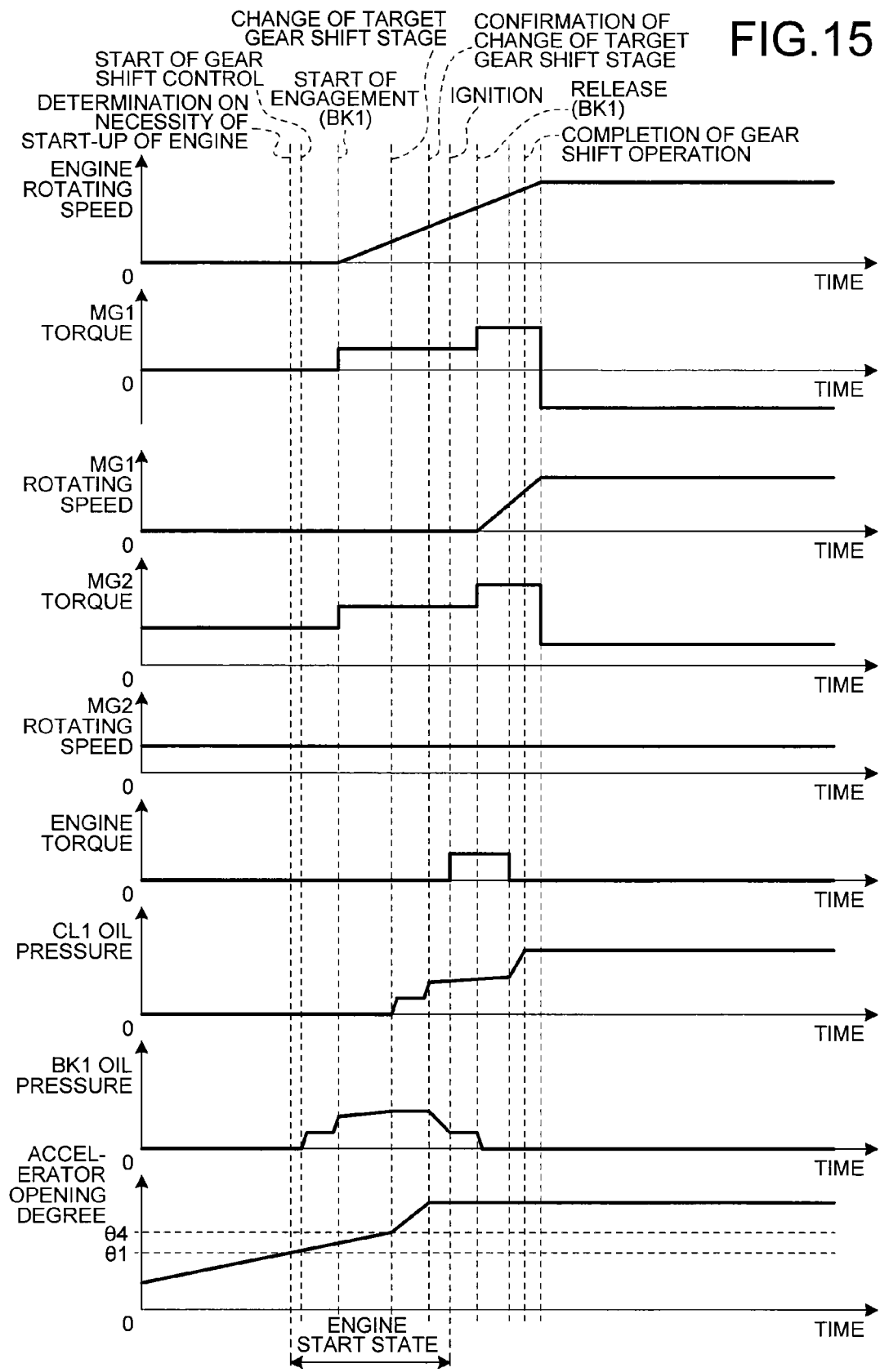
FIG. 15 is a time chart illustrating an operation when an engine is started up in an EV travel mode of the third modified example.
Figure 16:
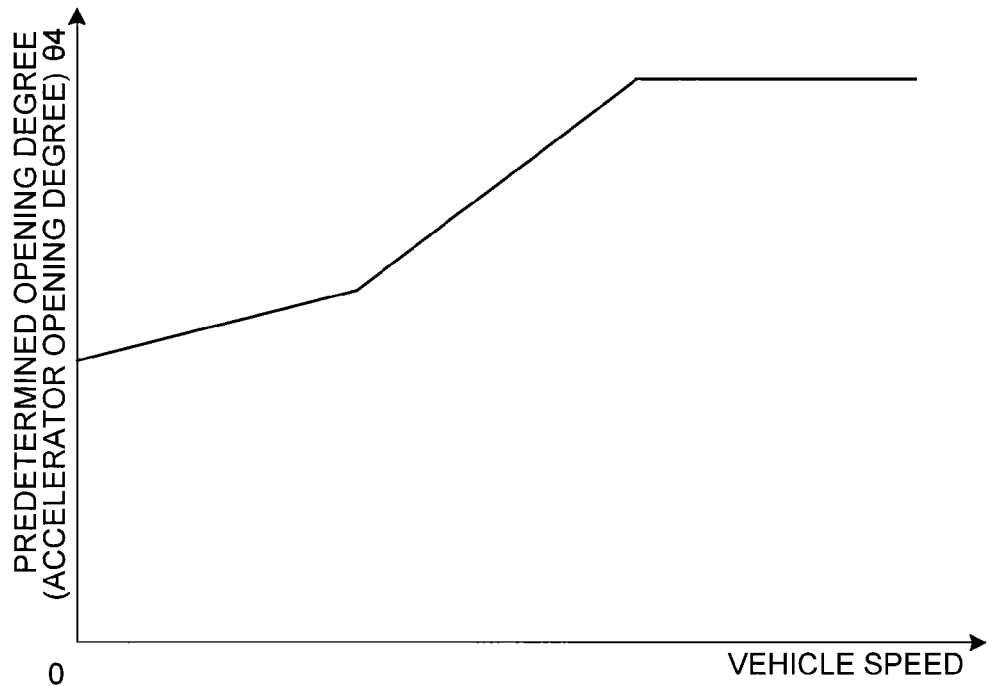
FIG. 16 is a diagram illustrating an example of a predetermined opening degree.

Hereinafter, an example thereof will be described with reference to the flowchart of FIG. 14 and the time chart of FIG. 15.

The HVECU 90 determines whether the target gear shift stage of the transmission device 20 is the low speed stage or the high speed stage (step ST11). In the time chart of FIG. 15, the target gear shift stage after the completion of the start-up of the engine is changed from the high speed stage to the low speed stage.

The HVECU 90 determines whether the engine ENG is currently started up (step ST12). The start-up state mentioned herein indicates a state where the engine rotating speed during the start-up of the engine is larger than zero. Thus, when it is determined that the start-up of the engine is currently performed, the gear shift operation of the transmission device 20 is already performed. Then, when the transmission device 20 of the EV travel mode is in the neutral state, it is understood that the clutch CL1 or the brake BK1 is in at least the half engagement state.

The HVECU 90 performs the process of step ST14 to be described later when the engine ENG is not started up currently (the engine rotating speed is zero). In this case, in step ST14, the gear shift operation to the target gear shift stage is started. However, when the current state is a state before the clutch CL1 or the brake BK1 becomes the half engagement state after the gear shift operation of the transmission device 20 is started, the gear shift operation is continued.

Meanwhile, the HVECU 90 determines whether the accelerator opening degree $\theta$ is larger than a predetermined opening degree $\theta4$ ($>\theta1$) when the engine ENG is currently started up (step ST13). The determination of step ST13 is performed to check whether the target gear shift stage of the transmission device 20 is changed during the gear shift operation.

Here, a difference between the vehicle driving force when the transmission device 20 is in the low speed stage and the vehicle driving force when the transmission device is in the high speed stage increases as the vehicle speed decreases. For this reason, the predetermined opening degree θ4 may be determined in response to the vehicle speed. The predetermined opening degree θ4 is determined based on, for example, the vehicle speed from the map of FIG. 16. The gear shift operation of the transmission device 20 is performed during the start-up of the engine at the smaller accelerator opening degree θ as the vehicle speed decreases at the predetermined opening degree θ4. Here, the determination is performed based on the accelerator opening degree θ. However, the determination of step ST13 may be performed in the same way as the determination using the required vehicle driving force corresponding to the accelerator opening degree θ.

When the accelerator opening degree θ is the predetermined opening degree θ4 or less or the required vehicle driving force is a predetermined value (the vehicle driving force corresponding to the predetermined opening degree θ4) or less, the HVECU 90 causes the routine to proceed to step ST15 to be described later since any change does not occur in the target gear shift stage of the transmission device 20 during the gear shift operation.

On the contrary, when the accelerator opening degree θ is larger than the predetermined opening degree θ4 or the required vehicle driving force is larger than a predetermined value, the HVECU 90 performs the gear shift operation to the target gear shift stage of the transmission device 20 (step ST14). In step ST14, when the determination of step ST13 is performed, the gear shift operation to the changed new target gear shift stage is performed.

The HVECU 90 determines whether the engine rotating speed increases to the rotating speed at which the ignition may be performed (step ST15). That is, here, it is determined whether the engine rotating speed becomes equal to or larger than the rotating speed at which the engine power can be increased.

When the engine rotating speed is smaller than the rotating speed at which the ignition may be, performed, the HVECU 90 first ends the calculation process.

On the contrary, when the engine rotating speed is equal to or larger than the rotating speed at which the ignition may be performed, the HVECU 90 increases the engine torque (step ST16). At that time, when the engine ENG is not ignited yet, the engine torque is increased after the engine ENG is ignited.

Figure 17:
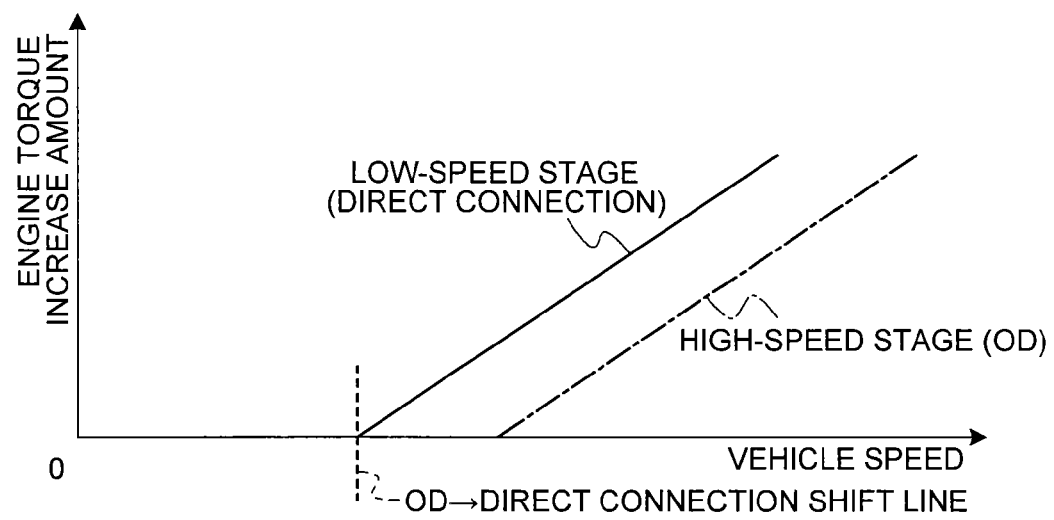
FIG. 17 is a diagram illustrating an example of an engine torque increase amount.

Here, an engine torque increase amount is calculated in which the amount of the inertia torque in the gear shift operation can be guaranteed, and the engine power corresponding to the engine torque increase amount is output. As illustrated in FIG. 17, the engine torque increase amount increases as the vehicle speed increases. This is because a change in the rotating speed (a rotating speed difference between the first engagement member and the second engagement member in the brake BK1 or the clutch CL1) necessary for the gear shift operation increases as the vehicle speed increases and the gear shift time is not slow remarkably. Thus, a large engine torque is needed. In this example, the engine torque increase amount is large in the low speed stage compared to the high speed stage at the same vehicle speed. Further, the engine torque increase amount may be set to be zero at the point in which the vehicle speed is near the shift line (for example, the shift line from the over-drive state and the direct connection state as indicated by the dashed line of FIG. 17). An increase in the engine torque is started along with, for example, the ignition of the engine ENG, and is performed until the clutch CL1 becomes substantially the full engagement state. In the time chart of FIG. 15, the engine torque is increased until the CL1 oil pressure is increased from the half engagement state to the full engagement state so that the clutch CL1 becomes the full engagement state.

In the hybrid system 1-1 and the power transmission device, when the target gear shift stage (the target transmission gear ratio) after the completion of the start-up of the engine is changed during the gear shift operation of the transmission device 20 in the start-up of the engine, the engine torque is increased during the gear shift operation to the changed new target gear shift stage (the target transmission gear ratio) so as to shorten the time necessary for the gear shift operation, and hence the output responsiveness of the required vehicle driving force after the gear shift operation can be improved. Further, in the hybrid system 1-1 and the power transmission device, the engine torque is increased during the gear shift operation of the transmission device 20 even when the target gear shift stage (the target transmission gear ratio) is not changed, and hence the time necessary for the gear shift operation can be shortened. Accordingly, it is possible to improve the output responsiveness of the required vehicle driving force after the gear shift operation.

Fourth Modified Example

Figure 18:
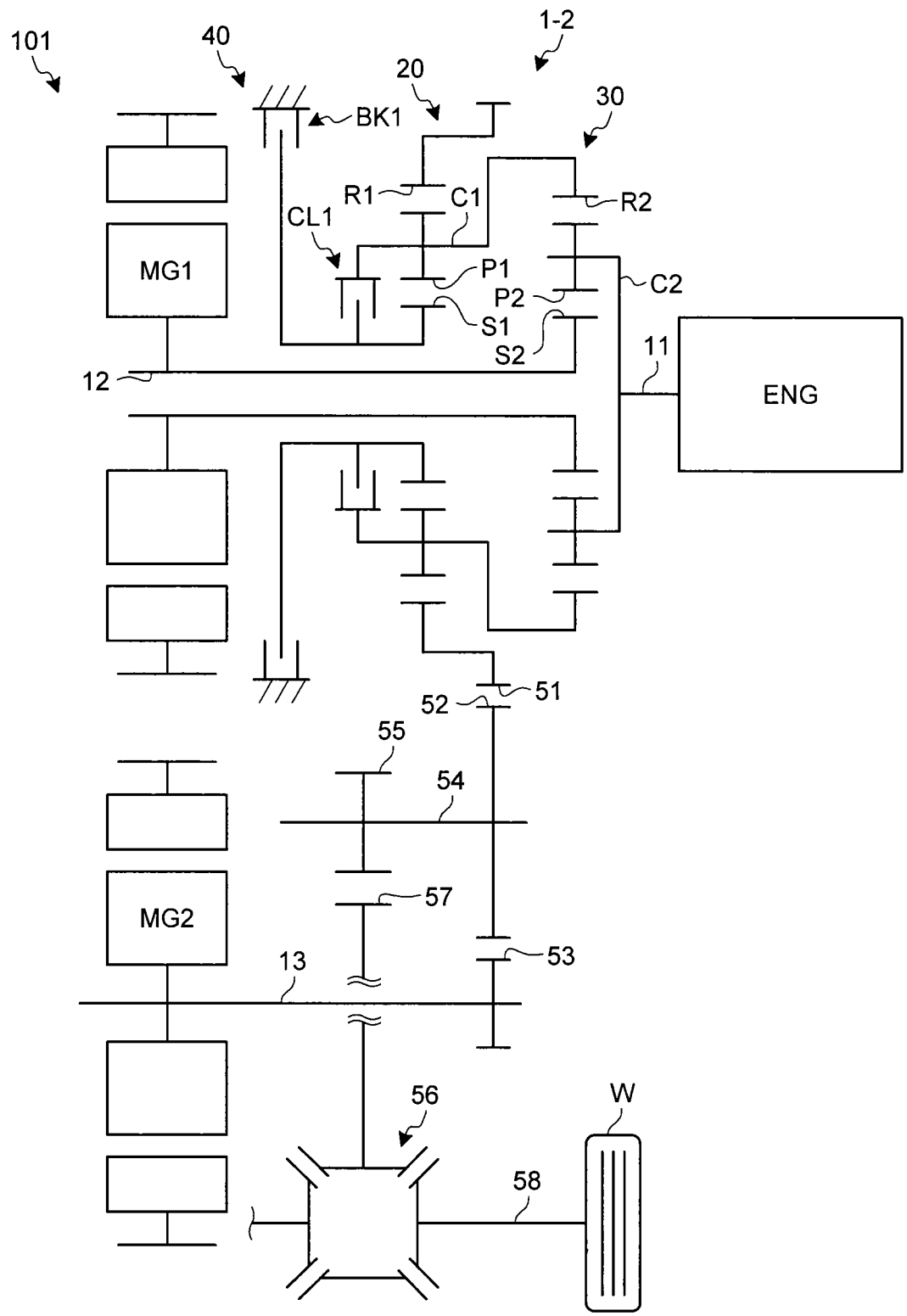
FIG. 18 is a skeleton diagram illustrating the configuration of a power transmission device for a hybrid vehicle and a hybrid system according to a fourth modified example.

The techniques of the above-described embodiment and the first to third modified examples can be also applied to a hybrid system 1-2 illustrated in FIG. 18 below, and the same effect as those of the embodiment and the first to third modified examples can be obtained. Reference Sign 101 of FIG. 18 indicates the hybrid vehicle equipped with the hybrid system 1-2.

Similarly to the hybrid system 1-1, the hybrid system 1-2 includes the engine ENG, the first rotating electric machine MG1, and the second rotating electric machine MG2 as the power sources, and further includes a power transmission device including the transmission device 20, the differential device 30, and the gear shift adjustment device 40. The power sources are the same as those of the hybrid system 1-1. Meanwhile, the power transmission device has a difference in configuration as below with respect to the power transmission device of the hybrid system 1-1.

The power transmission device of the hybrid system 1-2 has a different configuration in that the arrangement and the connection form of the transmission device 20 and the differential device 30 connected in series to each other are different.

The transmission device 20 includes a planetary gear mechanism (specifically, a single pinion type planetary gear mechanism) with a plurality of rotation component capable of performing a differential rotation thereof. Even in this example, the sun gear S1 is connected to the brake BK1 of the gear shift adjustment device 40. Further, even in this example, the clutch CL1 of the gear shift adjustment device 40 is interposed between the sun gear S1 and the carrier C1.

Here, in the hybrid system 1-2, the carrier C1 is connected to the differential device 30, and serves as a second power transmission component which transmits power to the differential device 30. In the hybrid system 1-2, since the engine ENG is connected to the differential device 30, the carrier C1 also serves as a first power transmission component which transmits power from the engine ENG. Further, in the hybrid system 1-2, the ring gear R1 of the transmission device 20 serves as the output component of the power transmission device including the transmission device 20 and the differential device 30, and is connected to the second rotating electric machine MG2 and the drive wheel W through the counter drive gear 51 or the like. The ring gear R1 rotates along with the counter drive gear 51.

The differential device 30 includes a planetary gear mechanism (specifically, a single pinion type planetary gear mechanism) with a plurality of rotation components capable of performing a differential operation thereof. Even in this example, the sun gear S2 is connected to the MG1 rotation shaft 12.

Here, in the hybrid system 1-2, the carrier C2 is connected to the engine ENG, and hence the carrier C2 and the engine rotation shaft 11 can be rotated together. Further, in the hybrid system 1-2, the ring gear R2 is connected to the carrier C1 of the transmission device 20, and hence the ring gear R2 and the carrier C1 can be rotated together.

FIG. 19 illustrates an operation engagement table of the hybrid system 1-2. The circle and the like are the same as those of FIG. 3.

[Single Motor EV Mode]

When the secondary battery can be charged, both the clutch CL1 and the brake BK1 are released so that the transmission device 20 is controlled in the neutral state. In the single motor EV mode (without needing the engine brake), since the regeneration power can be obtained without using the engine brake similarly to the hybrid system 1-1, the fuel economy (the electric economy) can be improved. Meanwhile, when the charging of the secondary battery is prohibited, only one of the clutch CL1 and the brake BK1 is engaged so as to rotate the engine ENG, and the engine brake is generated. Even in this case, the HVECU 90 increases the engine rotating speed by the control of the first rotating electric machine MG1 similarly to the hybrid system 1-1.

When the secondary battery can be charged in the backward movement mode, the vehicle may travel by using the power of only the second rotating electric machine MG2 while both the clutch CL1 and the brake BK1 are released or the vehicle may travel by using the power of both the first rotating electric machine MG1 and the second rotating electric machine MG2 while both the clutch CL1 and the brake BK1 are engaged and the carrier C1 of the transmission device 20 is fixed.

[HV Travel Mode]

Similarly to the hybrid system 1-1, the hybrid system 1-2 separately uses the HV high mode and the HV low mode in response to the vehicle speed. Thus, since two mechanical points exist even in the hybrid system 1-2, it is possible to improve the transmission efficiency when the transmission device is operated in the high gear state in the HV travel mode, and hence to improve the fuel economy when the vehicle travels at the high vehicle speed.

In the HV high mode, the transmission device 20 is switched to the high speed stage by the release of the clutch CL1 and the engagement of the brake BK1 so that the rotation of the engine ENG is output while the rotation speed thereof increases. Meanwhile, in the HV low mode, the transmission device 20 is switched to the low speed stage by the engagement of the clutch CL1 and the release of the brake BK1 so that the rotation of the engine ENG is output at the constant rotation speed. Even in the hybrid system 1-2, cooperative gear shift control of simultaneously shifting the transmission device 20 and the differential device 30 is performed in order to switch the HV high mode and the HV low mode. Thus, the hybrid system 1-2 can operate the electric continuously variable transmission of which the system transmission gear ratio is continuously changed by the electric control of the rotation of the first rotating electric machine MG1.

When the vehicle moves backward, the first rotating electric machine MG1 is operated as the generator and the second rotating electric machine MG2 is operated as the electric motor in the HV low mode, so that the second rotating electric machine MG2 is rotated in a direction opposite to the forward moving direction.

Incidentally, in the above-described embodiment and the first to fourth modified examples, the two-stage transmission device 20 is exemplified, but the transmission device 20 may have a gear stage of three stages or more or a continuously variable transmission. In the case of a stepped transmission, the transmission device 20 may have a configuration, for example, in which a plurality of gear stages are formed by the combination of the plurality of planetary gear mechanisms and the engagement device (the brake or the clutch) or may be a so-called general stepped automatic transmission. In the case of the continuously variable transmission, the transmission device 20 may be of, for example, a belt type or a ball planetary type. The transmission device 20 may be of any type of the above-described examples, and the input and output shafts thereof serve as a first power transmission component and a second power transmission component.

Further, in the above-described embodiment and the first to fourth modified examples, the hybrid vehicles 100 and 101 that charge the batteries thereof by the regeneration operation using the power of the engine ENG have been described, but the techniques described in the embodiment and the first to fourth modified examples may be also applied to a plug-in hybrid vehicle that can charge a battery thereof by an external power supply.

REFERENCE SIGNS LIST 1-1, 1-2 HYBRID SYSTEM
11 ENGINE ROTATION SHAFT
12 MG1 ROTATION SHAFT
13 MG2 ROTATION SHAFT
20 TRANSMISSION DEVICE
21 ROTATION SHAFT
30 DIFFERENTIAL DEVICE
40 GEAR SHIFT ADJUSTMENT DEVICE
100, 101 HYBRID VEHICLE
90 HVECU (INTEGRATED ECU)
91 ENGINE ECU
92 MGECU
BK1 BRAKE
CL1 CLUTCH
C1, C2 CARRIER
ENG ENGINE
MG1 FIRST ROTATING ELECTRIC MACHINE
MG2 SECOND ROTATING ELECTRIC MACHINE
P1, P2 PINION GEAR
R1, R2 RING GEAR
S1, S2 SUN GEAR
W DRIVE WHEEL

The invention claimed is:

1. A power transmission device for a hybrid vehicle, comprising:

a transmission device including a first power transmission component to which a rotation shaft of an engine is connected;

a differential device including a plurality of rotation components that perform differential rotation thereof and including a first rotation component connected to a second power transmission component of the transmission device, a second rotation component connected to a rotation shaft of a first rotating electric machine, and a third rotation component connected to a rotation shaft of a second rotating electric machine and a drive wheel;

a gear shift adjustment device that adjusts the transmission device to a neutral state where transmission of power between the first power transmission component and the second power transmission component is not allowed or to a state where the transmission of power between the first power transmission component and the second power transmission component is allowed; and an electronic control unit configured to include a first step of shifting the transmission device from the neutral state to a target transmission gear ratio or to a target gear shift stage after the start-up of the engine is completed in response to an accelerator opening degree change rate, a second step of increasing rotating speed of the first rotating electric machine, and a third step of controlling the start-up of the engine of which rotating speed is increased with an increase in the rotating speed of the first rotating electric machine, at a time the engine is started up in an EV travel mode of transmitting the power of at least one of the first and second rotating electric machines to the drive wheel.

2. The power transmission device for a hybrid vehicle according to claim 1, wherein the transmission device performs a gear shift operation to the target transmission gear ratio or the target gear shift stage in response to at least one of a vehicle speed, an accelerator operation amount, a throttle opening degree, and an accelerator operation speed.

3. The power transmission device for a hybrid vehicle according to claim 2, wherein at a time when a required vehicle driving force is changed during a first gear shift operation of the transmission device and the target transmission gear ratio or the target gear shift stage is changed in response to the after changed required vehicle driving force, the transmission device stops the first gear shift operation to the before changed target transmission gear ratio or target gear shift stage and performs a second gear shift operation to the after changed target transmission gear ratio or target gear shift stage.

4. The power transmission device for a hybrid vehicle according to claim 1, wherein at a time when a required vehicle driving force is changed during a first gear shift operation of the transmission device and the target transmission gear ratio or the target gear shift stage is changed in response to the after changed required vehicle driving force, the transmission device stops the first gear shift operation to the before changed target transmission gear ratio or target gear shift stage and performs a second gear shift operation to the after changed target transmission gear ratio or target gear shift stage.

5. The power transmission device for a hybrid vehicle according to claim 4, wherein at the time the gear shift operation to the after changed target transmission gear ratio or target gear shift stage is not completed during the start-up of the engine, the electronic control unit increases an output torque of the engine.

6. The power transmission device for a hybrid vehicle according to claim 5, wherein the transmission device performs the gear shift operation to the after changed target transmission gear ratio or target gear shift stage at the time the after changed required vehicle driving force is a predetermined value or more, and does not perform the gear shift operation to the after changed target transmission gear ratio or target gear shift stage at the time the after changed required vehicle driving force is smaller than the predetermined value.

7. The power transmission device for a hybrid vehicle according to claim 4, wherein the transmission device performs the gear shift operation to the after changed target transmission gear ratio or target gear shift stage at the time the after changed required vehicle driving force is a predetermined value or more, and does not perform the gear shift operation to the after changed target transmission gear ratio or target gear shift stage at the time the after changed required vehicle driving force is smaller than the predetermined value.

8. The power transmission device for a hybrid vehicle according to claim 1, wherein the engine start-up control in the third step is ignition control to the engine.

* * * * *